(12) United States Patent
Onishi

(10) Patent No.: US 8,799,420 B2
(45) Date of Patent: Aug. 5, 2014

(54) REMOTE MANAGEMENT SYSTEM

(75) Inventor: Kazuki Onishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 12/905,510

(22) Filed: Oct. 15, 2010

(65) Prior Publication Data

US 2011/0026080 A1 Feb. 3, 2011

Related U.S. Application Data

(63) Continuation of application No. 12/050,390, filed on Mar. 18, 2008, now Pat. No. 7,835,305.

(30) Foreign Application Priority Data

Mar. 19, 2007 (JP) ................................. 2007-071223

(51) Int. Cl.
- *G06F 15/177* (2006.01)
- *G06F 15/173* (2006.01)
- *G06F 9/00* (2006.01)
- *G06F 7/04* (2006.01)
- *G06F 3/12* (2006.01)

(52) U.S. Cl.
CPC .................................. *G06F 3/1229* (2013.01)
USPC ............. 709/220; 709/223; 709/224; 726/15; 726/30

(58) Field of Classification Search
CPC .................................................... G06F 3/1229
USPC .............. 370/254–258; 379/79; 709/203, 204
See application file for complete search history.

(56) References Cited

U.S. PATENT DOCUMENTS

| | | | |
|---|---|---|---|
| 6,480,955 B1 * | 11/2002 | DeKoning et al. ............. | 713/100 |
| 7,627,660 B2 | 12/2009 | Naitoh | |
| 7,644,154 B2 | 1/2010 | Tagawa et al. | |
| 8,116,337 B2 * | 2/2012 | Godlewski et al. ............ | 370/449 |
| 2002/0091850 A1 | 7/2002 | Perholtz et al. | |
| 2002/0143936 A1 | 10/2002 | Yu | |
| 2003/0101262 A1 * | 5/2003 | Godwin ......................... | 709/224 |
| 2004/0093493 A1 * | 5/2004 | Bisbee et al. .................. | 713/156 |
| 2004/0107352 A1 | 6/2004 | Yui et al. | |
| 2004/0117664 A1 | 6/2004 | Colvin | |
| 2005/0237543 A1 | 10/2005 | Kikuchi | |
| 2006/0101138 A1 | 5/2006 | Son | |
| 2006/0126603 A1 | 6/2006 | Shimizu et al. | |
| 2006/0236325 A1 | 10/2006 | Rao et al. | |

(Continued)

FOREIGN PATENT DOCUMENTS

JP 2000-29354 1/2000

*Primary Examiner* — Brandon Renner
(74) *Attorney, Agent, or Firm* — Oblon, Spivak, McClelland, Maier & Neustadt, L.L.P.

(57) ABSTRACT

A disclosed remote management system includes an electronic device; a communication adaptor; and a management apparatus connected via the communication adaptor to the electronic device and configured to remotely manage the electronic device. The communication adaptor includes a network segment specification unit for specifying a network segment to be managed, a device search unit configured to search the specified network segment to find the electronic device in the network segment, a remote management information obtaining unit configured to obtain remote management information from the found electronic device, a format verification unit configured to verify the obtained remote management information, an invalid device information sending/reporting unit configured to send or report electronic device information of the electronic device if the remote management information is invalid, and a change request sending unit configured to send a change request including updated remote management information to the electronic device.

9 Claims, 17 Drawing Sheets

(56) References Cited

U.S. PATENT DOCUMENTS

| | | |
|---|---|---|
| 2006/0242272 A1 | 10/2006 | Furukawa |
| 2006/0256711 A1* | 11/2006 | Kusama et al. ............... 370/216 |
| 2007/0055776 A1* | 3/2007 | Hom et al. .................... 709/225 |
| 2007/0073894 A1* | 3/2007 | Erickson et al. ............. 709/230 |
| 2007/0079368 A1* | 4/2007 | Takeyoshi et al. .............. 726/15 |
| 2007/0180263 A1 | 8/2007 | Delgrosso et al. |
| 2007/0192455 A1* | 8/2007 | Motoyama et al. ........... 709/223 |
| 2007/0206514 A1 | 9/2007 | Onishi |
| 2007/0263236 A1 | 11/2007 | Selvaraj |
| 2008/0209031 A1* | 8/2008 | Zhu et al. ...................... 709/224 |

* cited by examiner

US 8,799,420 B2

REMOTE MANAGEMENT SYSTEM

CROSS-REFERENCE TO RELATED APPLICATIONS

The present application is a continuation application of U.S. Ser. No. 12/050,390, entitled "Remote Management System" and filed Mar. 18, 2008 now U.S. Pat. No. 7,835,305, which is based on Japanese Priority Application No. 2007-071223, filed on Mar. 19, 2007, the entire contents of both of which are hereby incorporated herein by reference.

BACKGROUND OF THE INVENTION

1. Field of the Invention

The present invention generally relates to a remote management system including a management apparatus that remotely manages electronic devices (e.g., a copier, a fax machine, and a printer) via a communication adaptor.

2. Description of the Related Art

Patent document 1 discloses a remote management system where image forming apparatuses (office appliances) such as copiers in a user's office (or client's office) are connected via a communication adaptor (data communication device) and a communication line such as a public line to a central management apparatus (management apparatus) in a service center.

[Patent document 1] Japanese Patent Application Publication No. 2000-29354

In the disclosed remote management system, each office appliance in the client's office has a self-diagnosis function that sends serviceperson call (SC) information, which indicates, for example, a malfunction or failure of the office appliance, a maintenance timing, or a timing for replacing a consumable, via the communication adaptor and the communication line to the management apparatus. When receiving the SC information, the management apparatus transfers the SC information to a mobile terminal (e.g., a note PC) of a serviceperson who is in charge of repair, maintenance, and replacement of consumables of the office appliance sending the SC information.

When the SC information is displayed on the mobile terminal, the serviceperson visits the client's office where the office appliance is installed and performs repair, maintenance, or replacement of a consumable of the office appliance.

Meanwhile, in such a remote management system, office appliances (or electronic devices) in a client's office are normally connected to each other via a network such as a local area network (LAN) and managed by a network administrator (or a system manager) of the client.

As exemplified in (1) through (3) below, one problem with a conventional remote management system is the heavy workload of maintaining the system.

(1) It is laborious for a network administrator to manage networked office appliances in a remote management system.

(2) When introducing new office appliances into a client's office, a serviceperson has to confirm and reconfigure settings for remote management (remote management information) of existing office appliances.

(3) In an office where a remote management service has already been introduced, it often happens that remote management information (e.g., a device ID and a certificate) of office appliances is changed or deleted as a result of repair or maintenance (e.g., replacement of a motherboard). Since the remote management service cannot be provided without (correct) remote management information, a serviceperson has to set up the remote management information again.

SUMMARY OF THE INVENTION

Embodiments of the present invention provide a remote management system that solves or reduces one or more problems caused by the limitations and disadvantages of the related art.

An embodiment of the present invention provides a remote management system that includes an electronic device; a communication adaptor; and a management apparatus connected via the communication adaptor to the electronic device and configured to remotely manage the electronic device. The electronic device includes a remote management information retaining unit configured to retain remote management information, and a remote management information changing unit configured to change the remote management information in the remote management information retaining unit according to a change request from the communication adaptor. The communication adaptor includes a network segment specification unit for specifying a network segment to be managed, a device search unit configured to search the specified network segment to find the electronic device in the network segment, a remote management information obtaining unit configured to obtain the remote management information from the found electronic device, a format verification unit configured to determine whether the obtained remote management information is in a predetermined format, an invalid device information sending/reporting unit configured to determine that the remote management information is invalid remote management information if the remote management information is not in the predetermined format and to send or report electronic device information of the electronic device retaining the invalid remote management information, and a change request sending unit configured to receive updated remote management information returned in response to the sent or reported electronic device information and to send the change request including the updated remote management information to the electronic device retaining the invalid remote management information.

Another embodiment of the present invention provides a remote management system that includes an electronic device; a communication adaptor; and a management apparatus connected via the communication adaptor to the electronic device and configured to remotely manage the electronic device. The electronic device includes an encrypted communication unit configured to perform mutual authentication, an individual certificate retaining unit configured to store an individual certificate used as a mutual authentication certificate, the individual certificate including identification information for identifying the electronic device, a common certificate retaining unit configured to store a common certificate, the common certificate including common identification information for identifying a group of electronic devices to be managed, and an individual certificate changing unit configured to change the individual certificate in the individual certificate retaining unit according to a change request sent from the communication adaptor via encrypted communication using the common certificate. The communication adaptor includes an encrypted communication unit configured to perform mutual authentication, a network segment specification unit for specifying a network segment to be managed, a device search unit configured to search the specified network segment to find the electronic device in the network segment, a device information obtaining unit configured to obtain electronic device information from the found electronic device via encrypted communication, a certificate verification unit configured to verify the mutual authentication certificate used in the encrypted communication when the device information obtaining unit obtains the electronic device information, an invalid device information sending/reporting unit configured to send or report the electronic device information obtained by the device information obtaining unit as invalid electronic device information if the mutual authentication certificate is determined to be invalid by the certificate verification unit, and a change request sending unit configured to receive a correct individual certificate returned in response to the sent or reported invalid electronic device information and to send the change request including the correct individual certificate to the electronic device retaining the invalid electronic device information via encrypted communication using the common certificate.

Still another embodiment of the present invention provides a remote management system including an electronic device; a communication adaptor; and a management apparatus connected via the communication adaptor to the electronic device and configured to remotely manage the electronic device. The electronic device includes a remote management device information retaining unit configured to retain remote management device information of the communication adaptor, and a remote management device information changing unit configured to change the remote management device information in the remote management device information retaining unit according to a change request from the communication adaptor. The communication adaptor includes a network segment specification unit for specifying a network segment to be managed, a device search unit configured to search the specified network segment to find the electronic device in the network segment, a remote management device information obtaining unit configured to obtain the remote management device information from the found electronic device, a collating unit configured to compare the obtained remote management device information with current remote management device information in the communication adaptor, an invalid device information sending/reporting unit configured to determine that the obtained remote management device information is invalid remote management device information if the obtained remote management device information does not match the current remote management device information and to send or report electronic device information of the electronic device retaining the invalid remote management device information, and a change request sending unit configured to receive correct remote management device information returned in response to the sent or reported electronic device information and to send the change request including the correct remote management device information to the electronic device retaining the invalid remote management device information.

DESCRIPTION OF THE PREFERRED EMBODIMENTS

Preferred embodiments of the present invention are described below with reference to the accompanying drawings.

Figure 1:
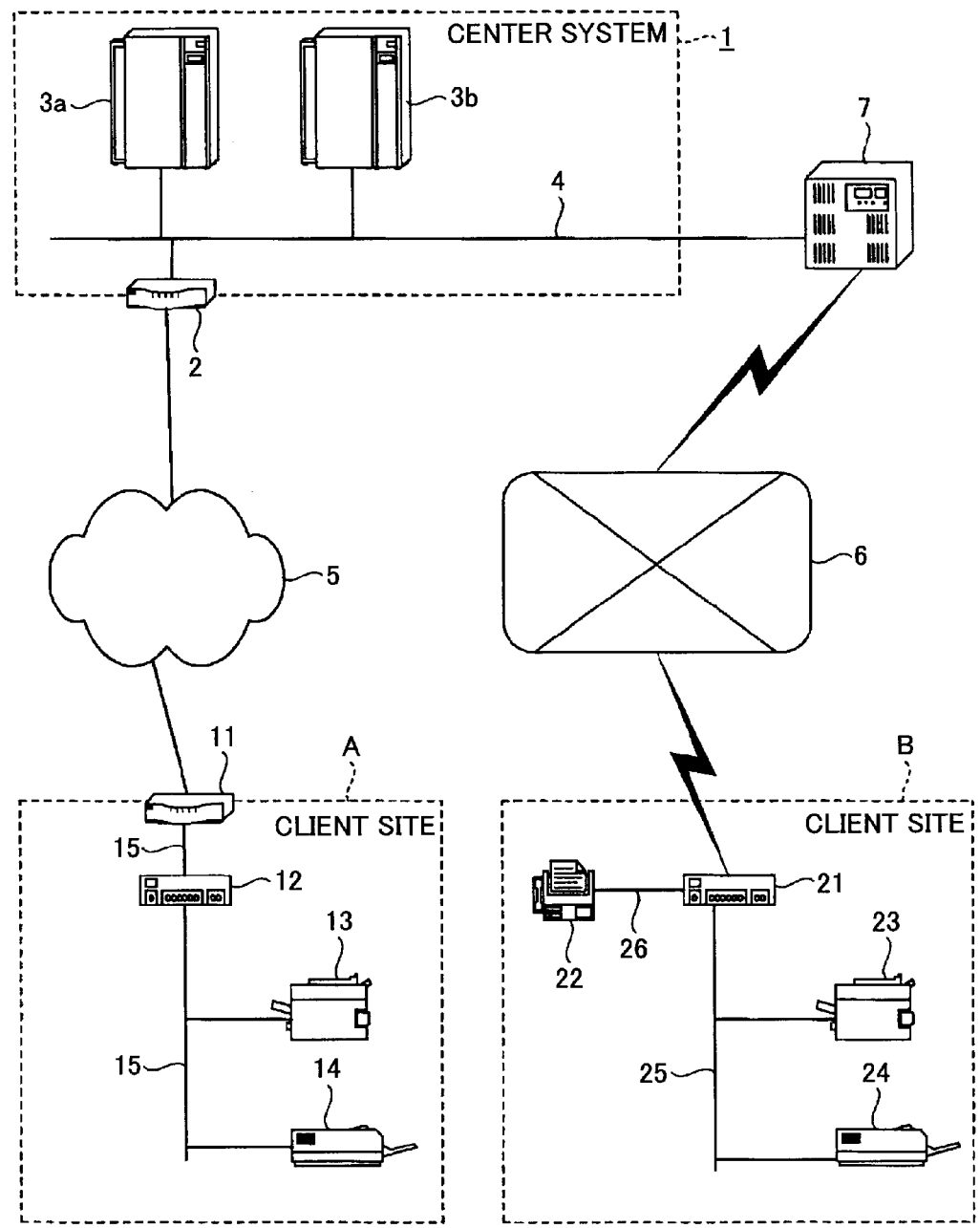
FIG. 1 is a drawing illustrating an exemplary configuration of a remote management system.

FIG. 1 is a drawing illustrating an exemplary configuration of a remote management system (image forming apparatus management system) 100.

The image forming apparatus management system 100 includes a center system 1 that is a central management system in a service center, and electronic devices in client sites (user sites) A and B.

The center system 1 includes a router 2 and servers 3a and 3b connected to each other via a network 4 such as a LAN.

Electronic devices in the client site A include a router 11, a communication adaptor 12 connected via the router 11 and Internet 5 to the center system 1, and office appliances (image forming apparatuses) such as a copier 13 and a printer 14. The router 11, the communication adaptor 12, and the office appliances are connected to each other via a network 15 such as a LAN and form a network segment.

Electronic devices in the client site B include a communication adaptor 21 connected via a public telecommunication network 6 and an access point 7 to the center system 1, and office appliances such as a fax machine 22, a copier 23 and a printer 24. The communication adaptor 21, the copier 23, and the printer 24 are connected to each other via a network 25 such as a LAN and the communication adaptor 21 and the fax machine 22 are connected via a dedicated I/F 26. Thus, the electronic devices in the client site B form a network segment.

Figure 2:
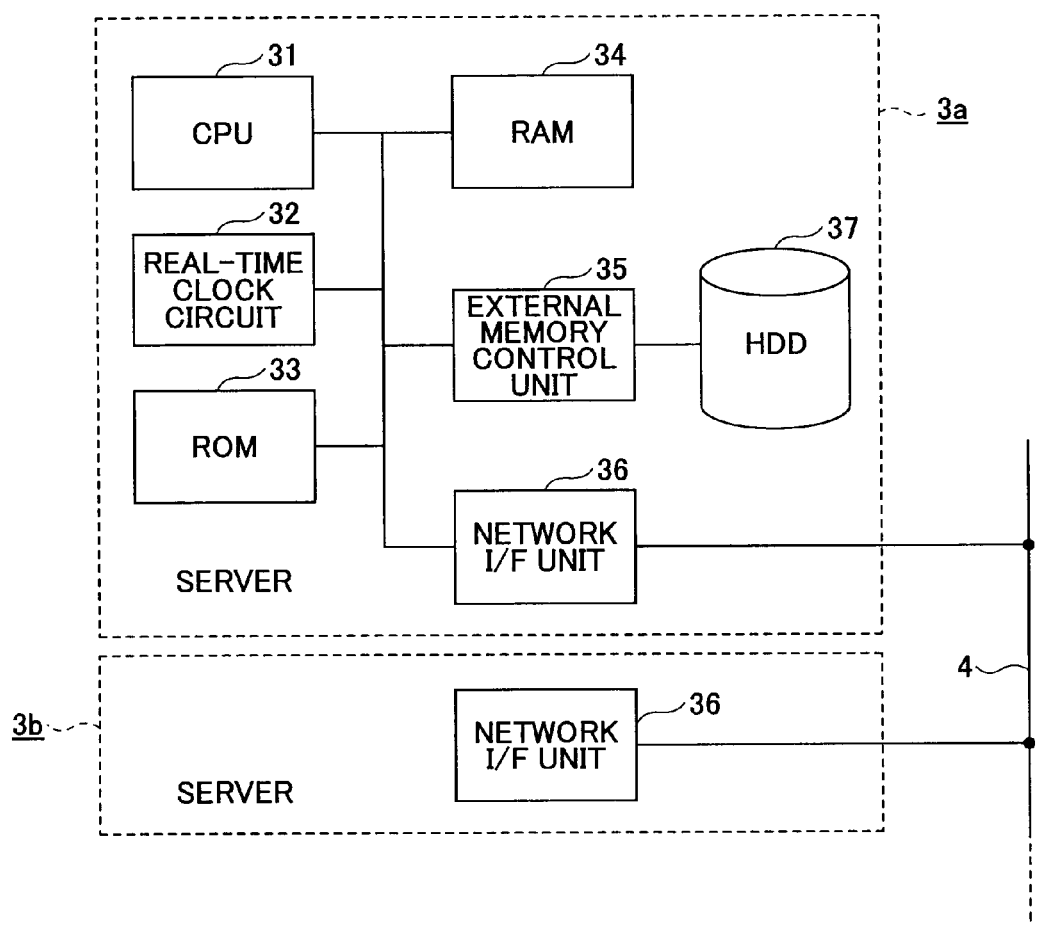
FIG. 2 is a block diagram illustrating an exemplary configuration of a server 3a shown in FIG. 1.

FIG. 2 is a block diagram illustrating an exemplary configuration of the server 3a.

The server 3a includes a CPU 31, a real-time clock circuit 32, a ROM 33, a RAM 34, an external memory control unit 35, a network I/F unit 36, and a hard disk drive (HDD) 37. The server 3b has substantially the same configuration as that of the server 3a. Therefore, components of the server 3b other than a network I/F unit 36 and their descriptions are omitted.

The CPU 31 is a central processing unit that controls the entire server 3a according a control program in the ROM 33. The real-time clock circuit 32 generates time information supplied to the CPU 31. The CPU 31 determines the current time based on the time information. The ROM 33 is a read-only memory storing fixed data such as a control program to be executed by the CPU 31. The RAM 34 is a random access memory used, for example, as a working memory by the CPU 31 to process data. The external memory control unit 35 is an interface for the HDD 37.

The network I/F unit 36 interfaces the server 3a with other devices, such as the server 3b and the router 2, in the network 4.

The HDD 37 stores information including the latest (or current) user authentication information (e.g., user information) and maintenance rights (access rights) of privileged users (maintenance persons) as a database (DB). The HDD 37 functions as an invalid device information storing unit and a user authentication information storing unit. Alternatively, the server 3a may include a non-volatile memory for storing the latest user authentication information and the maintenance rights of privileged users.

The CPU 31 of each of the servers 3a and 3b executes a control program in the ROM 33 and controls the RAM 34, the external memory control unit 35, and the network I/F unit 36 to implement a remote management information sending unit, an individual certificate sending unit, a remote management device information sending unit, a user authentication unit, and a user authentication result sending unit according to an embodiment of the present invention.

Alternatively, the control program may be installed into an HDD or a RAM of each of the servers 3a and 3b from a recording medium (e.g., a flexible disk or an optical disk) inserted into an internal or external disk drive.

Also, a terminal (not shown) such as a personal computer is connected to the servers 3a and 3b. The terminal implements a remote management information input unit, an individual certificate input unit, and a remote management device information input unit according to an embodiment of the present invention.

Figure 3:
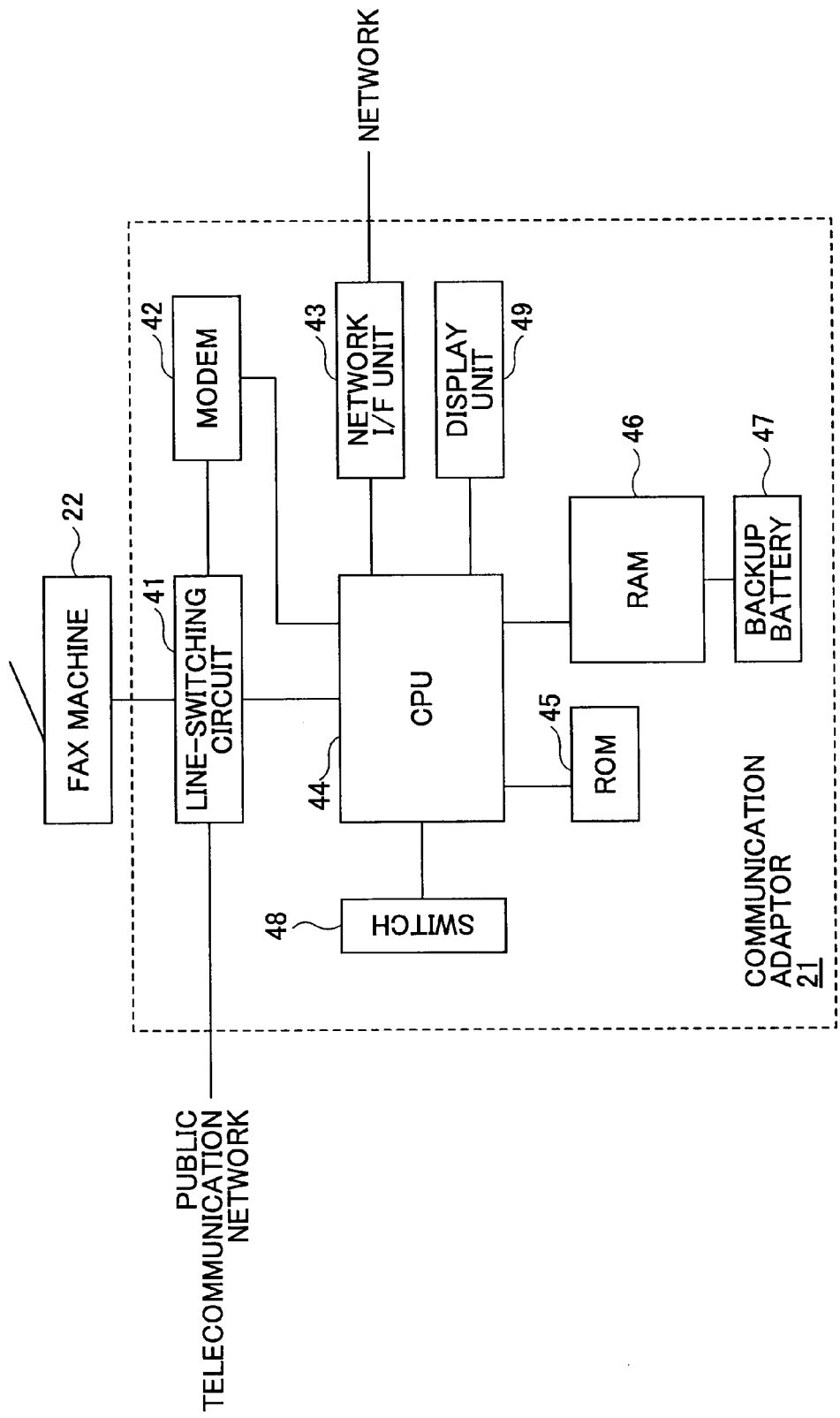
FIG. 3 is a block diagram illustrating an exemplary configuration of a communication adaptor 21 shown in FIG. 1.

FIG. 3 is a block diagram illustrating an exemplary configuration of the communication adaptor 21 shown in FIG. 1. The communication adaptor 12 has substantially the same configuration as that of the communication adaptor 21, and therefore descriptions and illustration of the communication adaptor 12 are omitted here. The communication adaptor 12 is different from the communication adaptor 21 in that it communicates with the router 11.

In the communication adaptor 21, data from the public telecommunication network 6 are first input to a line-switching circuit 41. If the data from the public telecommunication network 6 are directed to the fax machine 22 connected to the communication adaptor 21, the line-switching circuit 41 connects the public telecommunication network 6 and the fax machine 22. If the data are from the center system 1, the line-switching circuit 41 connects the public telecommunication network 6 and a modem 42.

A network I/F unit 43 communicates with the office appliances such as the copier 23 and the printer 24 connected to the network 25.

The line-switching circuit 41, the modem 42, and the network I/F unit 43 are controlled mainly by the CPU 44 according to a control program (e.g., firmware) in a ROM 45.

The ROM 45 stores fixed data such as a control program to be executed by the CPU 44. A RAM 46 stores information such as user authentication information (user information, access rights, etc.) of users having access rights to the office appliances. A backup battery 47 is connected to the RAM 46. A switch 48 selects operation modes. A display unit 49 displays information.

The communication adaptor 21 polls the office appliances connected to itself at intervals in the order of device addresses assigned to the office appliances.

The CPU 44 of each of the communication adaptors 12 and 21 executes a control program in the ROM 45 and controls the network I/F unit 43, the RAM 46, and the display unit 49 to implement a network segment specification unit, a device search unit, a remote management information obtaining unit, a format verification unit, an invalid device information sending/reporting unit, a change request sending unit, a device information obtaining unit, a status change detection unit, a status change information sending unit, a user authentication information input unit, a user identification unit, a user authentication request sending unit, a remote management information input unit, an encrypted communication unit, a certificate verification unit, a remote management device information obtaining unit, a collating unit, and a remote management device information input unit according to an embodiment of the present invention.

Figure 4:
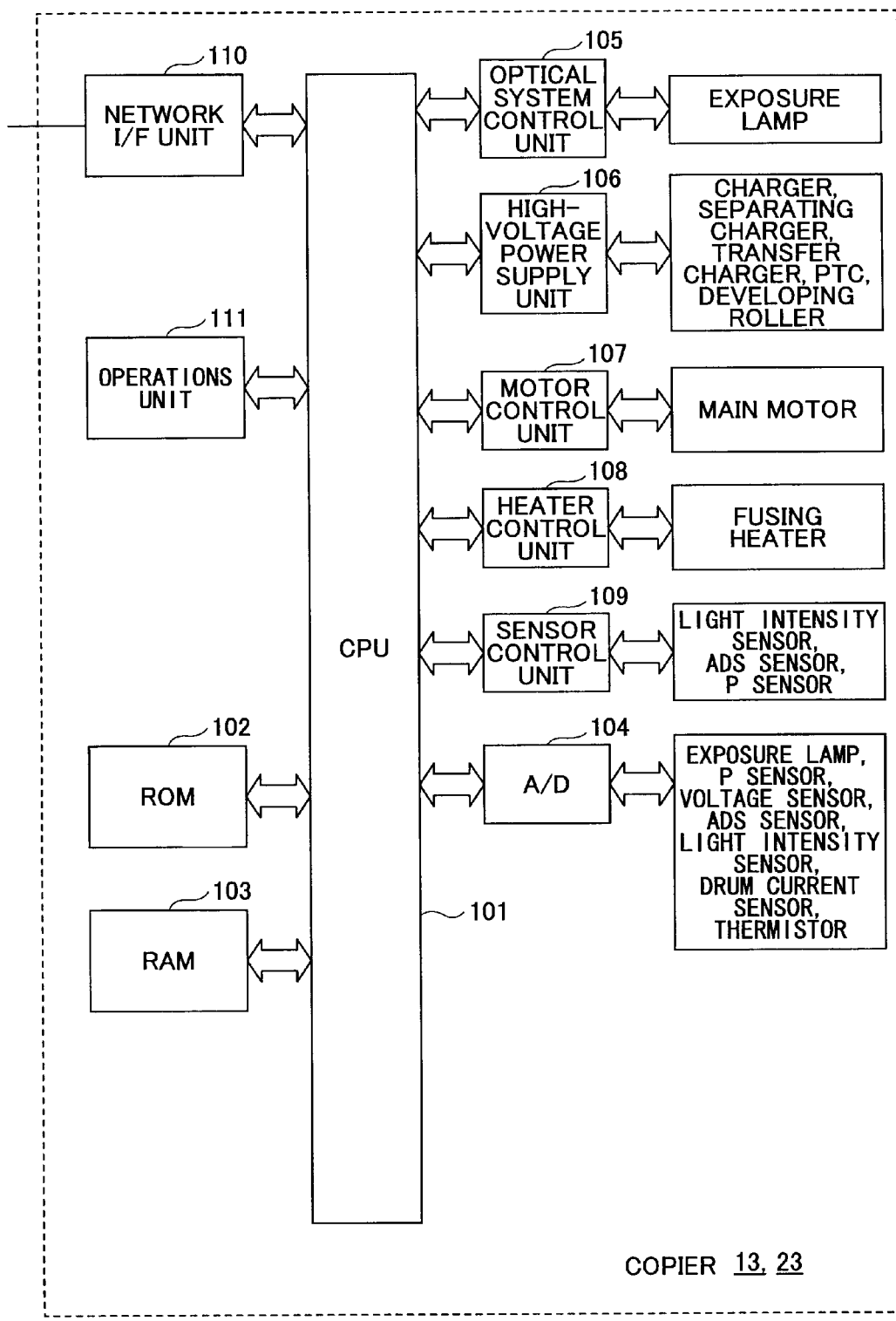
FIG. 4 is a block diagram illustrating an exemplary configuration of a control system of copiers 13, 23 shown in FIG. 1.

FIG. 4 is a block diagram illustrating an exemplary configuration of a control system of the copiers 13, 23 shown in FIG. 1. The control systems of the copiers 13 and 23 have substantially the same configuration and therefore descriptions below are made using the copier 13.

Operations of the copier 13 are controlled mainly by a CPU 101 according to a control program and data stored in a ROM 102. A RAM (storage unit) 103, for example, stores intermediate results of processing, various settings, and statuses of the copier 13. The RAM 103 is implemented, for example, by a non-volatile RAM backed up by a battery. The RAM 103 implements a remote management information retaining unit, an individual certificate retaining unit, a common certificate retaining unit, and a remote management device information retaining unit according to an embodiment of the present invention. Alternatively, the above units may be implemented by a non-volatile storage medium such as a non-volatile memory or an HDD provided separately from the RAM 103.

An A/D converter 104 is used, for example, to input: a voltage supplied to an exposure lamp; light-emission and light-reception voltages of a P sensor; an output from a voltage sensor; an output from an ADS sensor; an output from a light intensity sensor for detecting the intensity of light from the exposure lamp; an output from a drum current sensor for detecting the electric current flowing through a photoconductor drum; and a voltage of a thermistor in a fusing unit.

An optical system control unit 105 controls the exposure lamp.

A high-voltage power supply unit 106 provides high voltages applied to a charger, a separating charger, a transfer charger, and a pre-transfer charger (PTC) and also provides a developing bias voltage applied to a developing roller in a developing unit.

A motor control unit 107 controls a main motor that drives the photoconductive drum, paper-feed units, and rollers in a paper-conveying unit.

A heater control unit 108 controls electricity supplied to a fusing heater that heats a fusing roller in the fusing unit and thereby maintains the surface temperature of the fusing roller within a predetermined range.

A sensor control unit 109 controls, for example, the photodetection gain of the light intensity sensor, the photodetection gain of the ADS sensor, the photodetection gain of the P sensor, and the light-emission voltage of an LED of the P sensor.

A network I/F unit 110 communicates with the communication adaptor 12 (or the communication adaptor 21 in the case of the copier 23).

An operations unit 111 is, for example, an operations/display panel including a display unit for displaying information and switches (or operation keys) for inputting information.

The CPU 101 of each of the copiers 13 and 23 executes a control program in the ROM 102 and controls the RAM 103, the network I/F unit 110, and the operations unit 111 to implement a remote management information changing unit, an encrypted communication unit, an individual certificate changing unit, and a remote management device information changing unit.

Control systems of the printers 14 and 24 also have a configuration similar to that of the copiers 13 and 23, and therefore descriptions and illustration of the control systems of the printers 14 and 24 are omitted.

Next, control processes in the remote management system 100 according to embodiments of the present invention are described with reference to FIGS. 5 through 17. Below, for descriptive purposes, communications between the communication adaptor 21 and image forming apparatuses such as the copier 23 and the printer 24 (hereafter called office appliances) in the client site B, and communications between the communication adaptor 21 and the server 3a of the center system 1 are mainly discussed. Also, as shown in FIG. 5, it is assumed that copiers 231 through 233 and printers 241 through 243 are connected to the communication adaptor 21 in addition to the copier 23 and the printer 24 shown in FIG. 1.

First Embodiment

A first embodiment of the present invention is described below.

Figure 5:
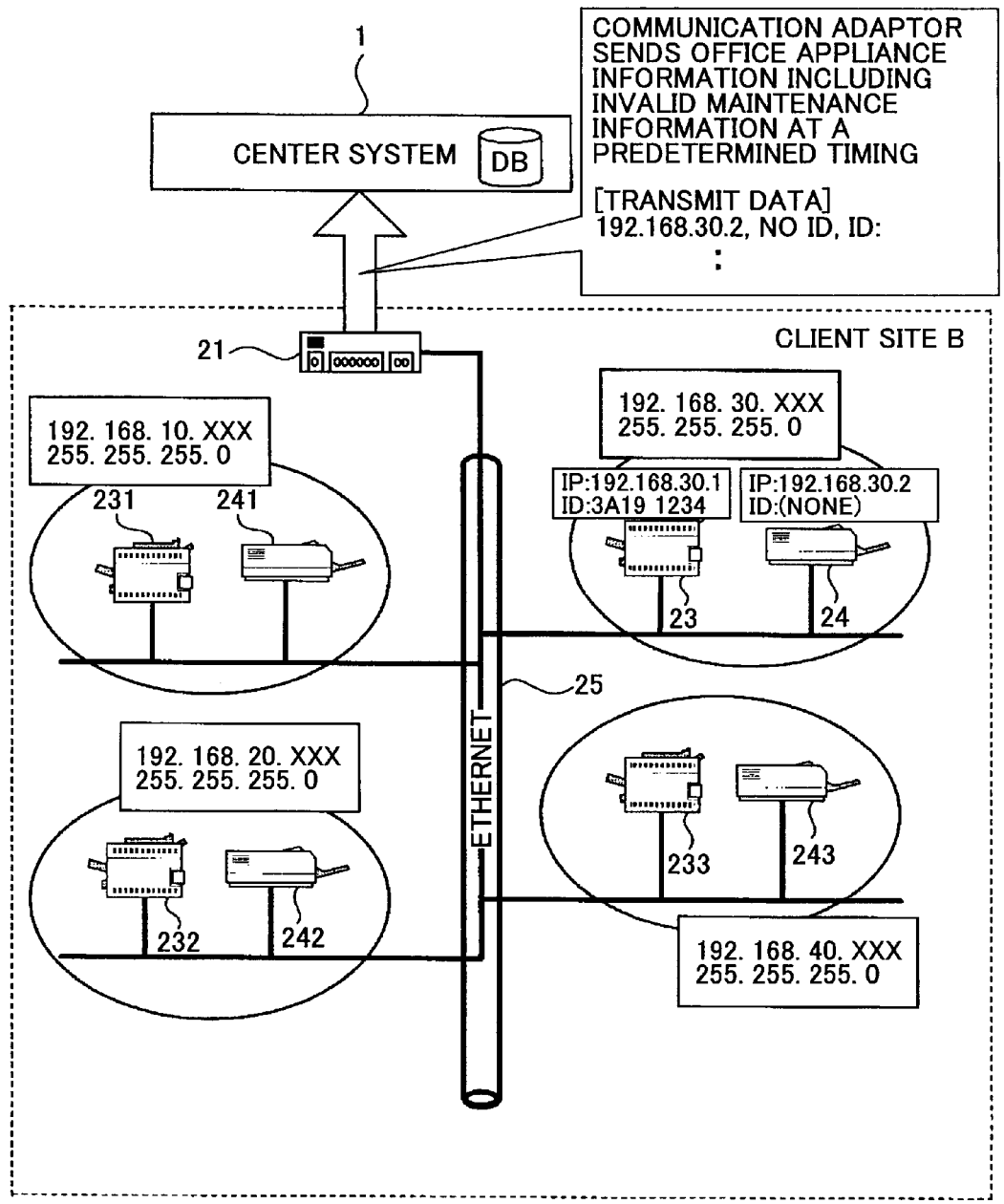
FIG. 5 is a drawing illustrating a first exemplary communication process where the communication adaptor 21 sends office appliance information including invalid maintenance information to a center system 1.

FIG. 5 is a drawing illustrating a first exemplary communication process where the communication adaptor 21 sends office appliance information including invalid maintenance information to the center system 1.

Figure 6:
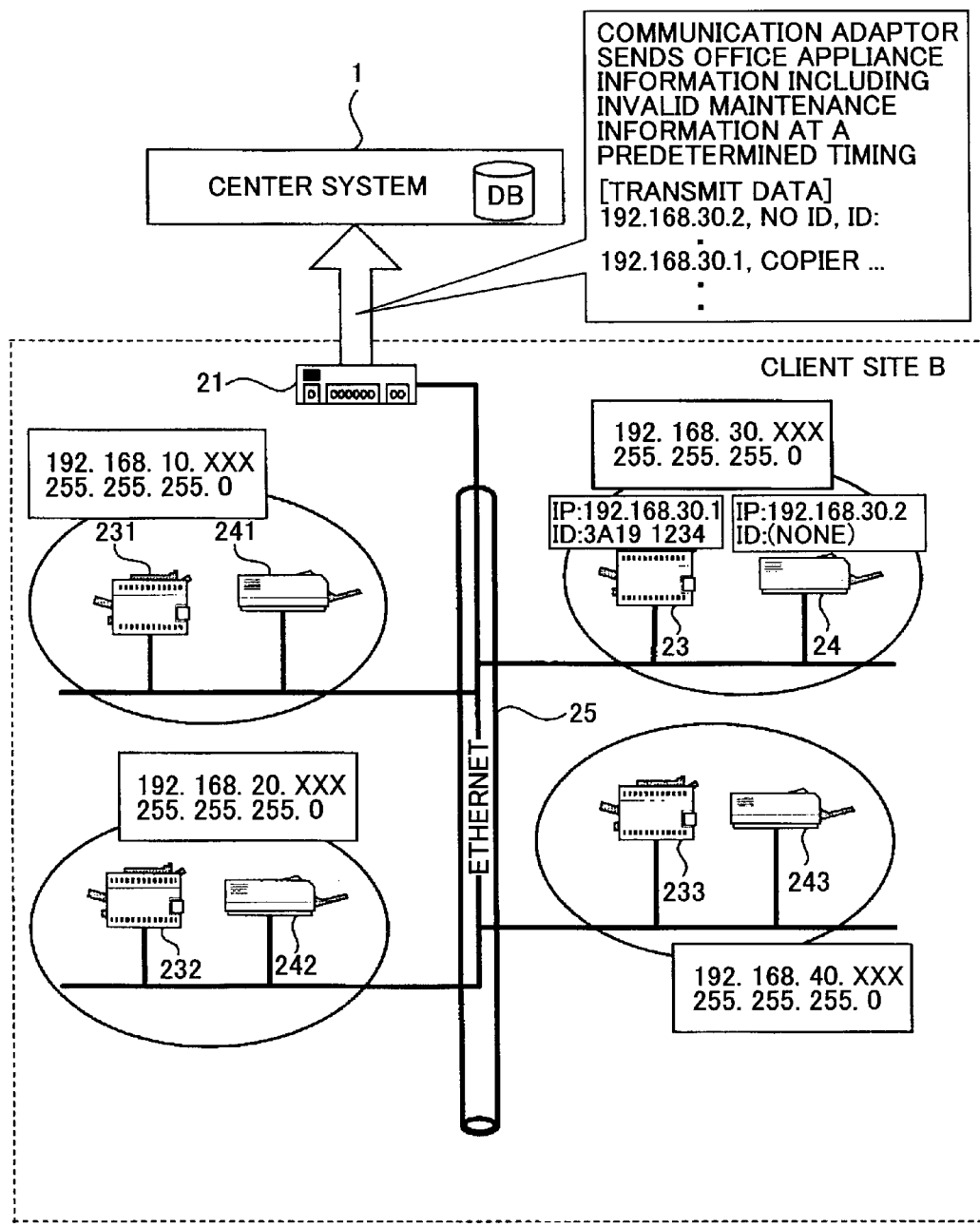
FIG. 6 is a drawing illustrating a second exemplary communication process where the communication adaptor 21 sends office appliance information including invalid maintenance information to the center system 1.

FIG. 6 is a drawing illustrating a second exemplary communication process where the communication adaptor 21 sends office appliance information including invalid maintenance information to the center system 1.

Figure 7:
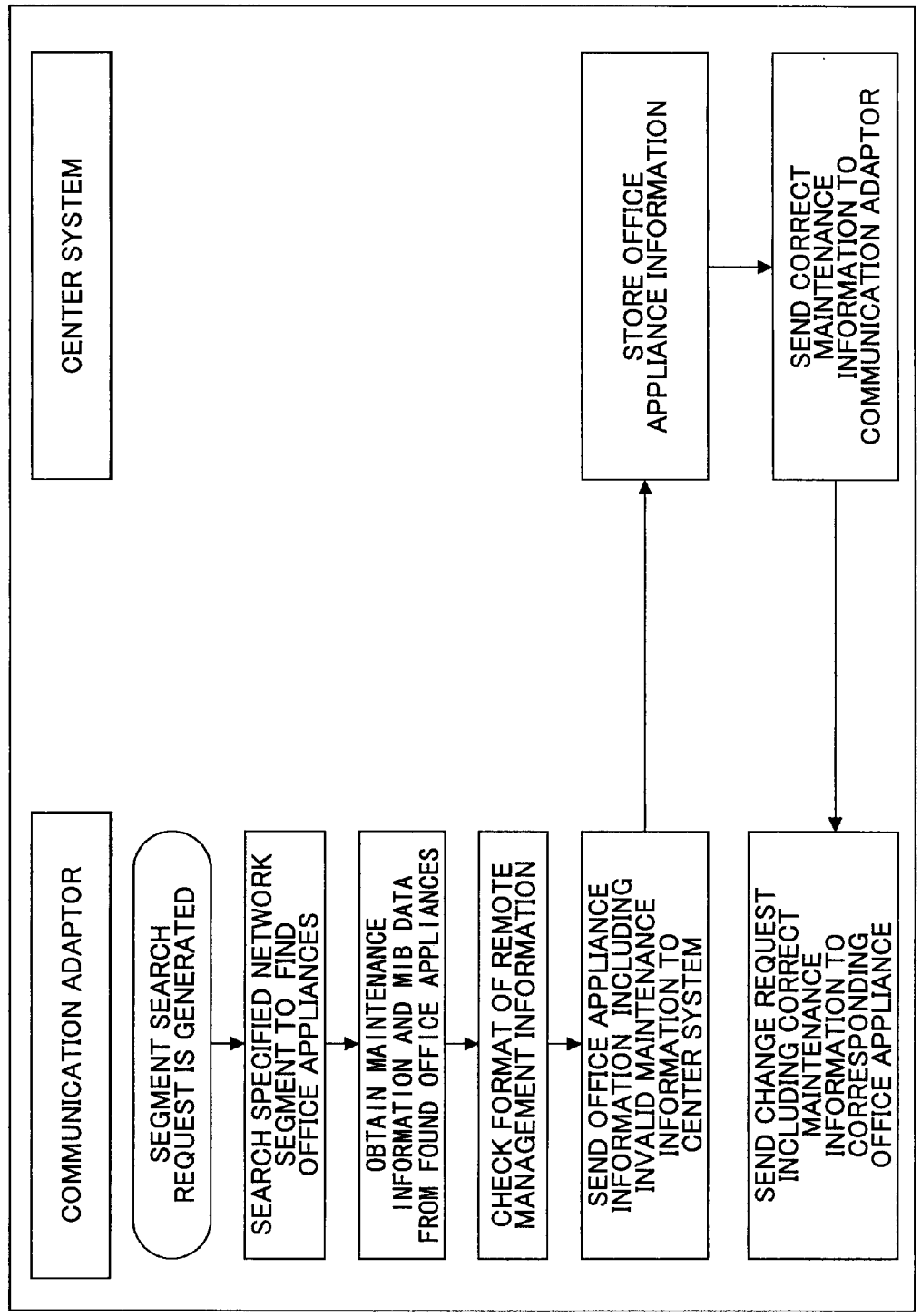
FIG. 7 is a flowchart showing a first exemplary communication process between the communication adaptor 21 and the center system 1 performed when a segment search request is generated in the communication adaptor 21.

FIG. 7 is a flowchart showing a first exemplary communication process between the communication adaptor 21 and the center system 1 performed when a segment search request is generated in the communication adaptor 21.

As shown in FIG. 5, the communication adaptor 21 is installed in the client site B where the network 25 is divided into multiple network segments. Here, it is assumed that a network segment "192.168.30.0, subnet mask: 255.255.255.0" is specified as a target network segment to be managed, the specified network segment is searched to find office appliances once a day at 0:00 a.m., and office appliance information (electronic device information) of the found office appliances in the network segment is sent to the center system 1 once a week on Sunday at 0:00 a.m.

When a segment search request is generated at a search timing "once a day at 0:00 a.m.", the CPU 44 of the communication adaptor 21 (hereafter, "the CPU 44 of the communication adaptor 21" may be simply referred to as "the communication adaptor 21") searches the network segment "192.168.30.0, subnet mask: 255.255.255.0" to find the office appliances.

The communication adaptor 21 searches the specified network segment by checking IP addresses 192.168.30.1 through 192.168.30.255 one by one, obtains management information base (MIB) data from each electronic device found by the search using the simple network management protocol (SNMP), and determines whether the electronic device is an office appliance.

For example, the communication adaptor 21 determines that an electronic device is an office appliance if the electronic device responds to a request for a Web service over the hypertext transfer protocol security (HTTPS) when obtaining the MIB data, or if the obtained MIB data (e.g., "RFC1514 1.3.6.1.2.1.25. HOST-RESOURCES-MIB") contain information (e.g., "OID, hrDevicePrinter (1.3.6.1.2.1.25.3.1.5)" indicating an office appliance.

From each of the found office appliances (for example, from the RAM 103 shown in FIG. 4), the communication adaptor 21 obtains maintenance information (a remote management ID (remote management information), a model name, a model number, and a device ID), for example, via a Web service over HTTPS, and also obtains other MIB data (e.g., "printerMIB" information) using SNMP. The communication adaptor 21 sends the obtained information (office appliance information or electronic device information) of office appliances in the specified network segment to the center system 1.

More specifically, as shown in FIG. 7, when a segment search request is generated, the communication adaptor 21 searches a specified network segment to find office appliances, obtains maintenance information including remote management information (remote management ID), a model name, a model number, and a device ID from each of the found office appliances, and also obtains other MIB data (e.g., "printerMIB" information) from each of the found office appliances using SNMP. Then, the communication adaptor 21 checks the remote management information (remote management ID) of each of the office appliances and determines whether the remote management information is in a predetermined (or correct) format.

For example, the communication adaptor 21 determines that the remote management information is valid if it is composed of ten alphanumeric characters and contains no control code, and determines that the remote management information is invalid if it contains more or less than ten characters and/or contains a control code.

The remote management information retained in an office appliance is not changeable with a user interface of the office appliance. Therefore, if the remote management information of an office appliance is in a wrong format, it is likely that the layout of office appliances in the client site B has been changed.

If the remote management information is invalid, the communication adaptor 21 determines that the maintenance information including the invalid remote management information is invalid, and sends the office appliance information (including the invalid maintenance information and other MIB data) of the corresponding office appliance to the center system 1. The office appliance information to be sent to the center system 1 may either include an ID identifying the office appliance (FIG. 6) or not include an ID identifying the office appliance (FIG. 5).

When receiving the office appliance information including the invalid maintenance information from the communication adaptor 21, the CPU 31 of the server 3a of the center system 1 stores the office appliance information (in a database) in the HDD 37. Then, the CPU 31 displays the office appliance information on a display unit of a terminal connected to the server 3a.

An operator checks the displayed office appliance information, determines correct maintenance information (including correct remote management information), and enters the correct maintenance information on the display unit or from an input unit of the terminal. In other words, the operator updates the remote management information using the display unit or the input unit of the terminal.

The CPU 31 of the server 3a sends the correct maintenance information to the communication adaptor 21.

Alternatively, the server 3a may perform a process described below when the office appliance information is received from the communication adaptor 21. In the alternative process, the CPU 31 of the server 3a searches a database in the HDD 37 for office appliance information corresponding to the received office appliance information based on, for example, the MIB data in the received office appliance information. If matching office appliance information is found, the CPU 31 automatically determines correct maintenance information (including correct remote management information) to be sent to the communication adaptor 21 based on the found office appliance information.

When receiving the correct maintenance information from the center system 1, the communication adaptor 21 sends a change request including the correct maintenance information to the office appliance where the invalid maintenance information is retained.

When receiving the change request, the CPU of the office appliance writes the correct maintenance information into its non-volatile memory (overwrites the invalid maintenance information with the correct maintenance information). For example, assuming that the copier 23 retains invalid maintenance information, the CPU 101 of the copier 23 writes the correct maintenance information into the RAM 103.

In the exemplary process described above, a specified network segment is searched once a day at 0:00 a.m. to find office appliances, and office appliance information of the found office appliances is sent to the center system 1 once a week on Sunday at 0:00 a.m. In this case, the office appliance information of the found office appliances is preferably obtained once a week on Sunday at 0:00 a.m. and immediately sent to the center system 1. On the other hand, if office appliance information of the found office appliances is obtained once a day at 0:00 a.m., the obtained office appliance information is temporarily stored in the RAM 46 and retrieved at the timing when it is sent to the center system 1.

Thus, according to the first embodiment, a communication adaptor searches a specified network segment to find office appliances, obtains remote management information from the found office appliances, and determines whether the obtained remote management information of each of the found office appliances is in a predetermined format (or valid). If the obtained remote management information is invalid, the communication adaptor sends office appliance information of the office appliance retaining the invalid remote management information to a center system (management apparatus). In response to the office appliance information, the center system returns updated new, or correct) remote management information to the communication adaptor. The communication adaptor sends a change request including the updated remote management information to the office appliance retaining the invalid remote management information, and the office appliance overwrites the invalid remote management information with the updated remote management information. This configuration or mechanism makes it possible to promptly detect invalid remote management information of office appliances in a client's network and to efficiently correct the invalid remote management information. This in turn reduces the workload of a network administrator in managing office appliances as well as the workload of a maintenance person (serviceperson) in his/her maintenance work.

Second Embodiment

Next, a second embodiment of the present invention is described.

Figure 8:
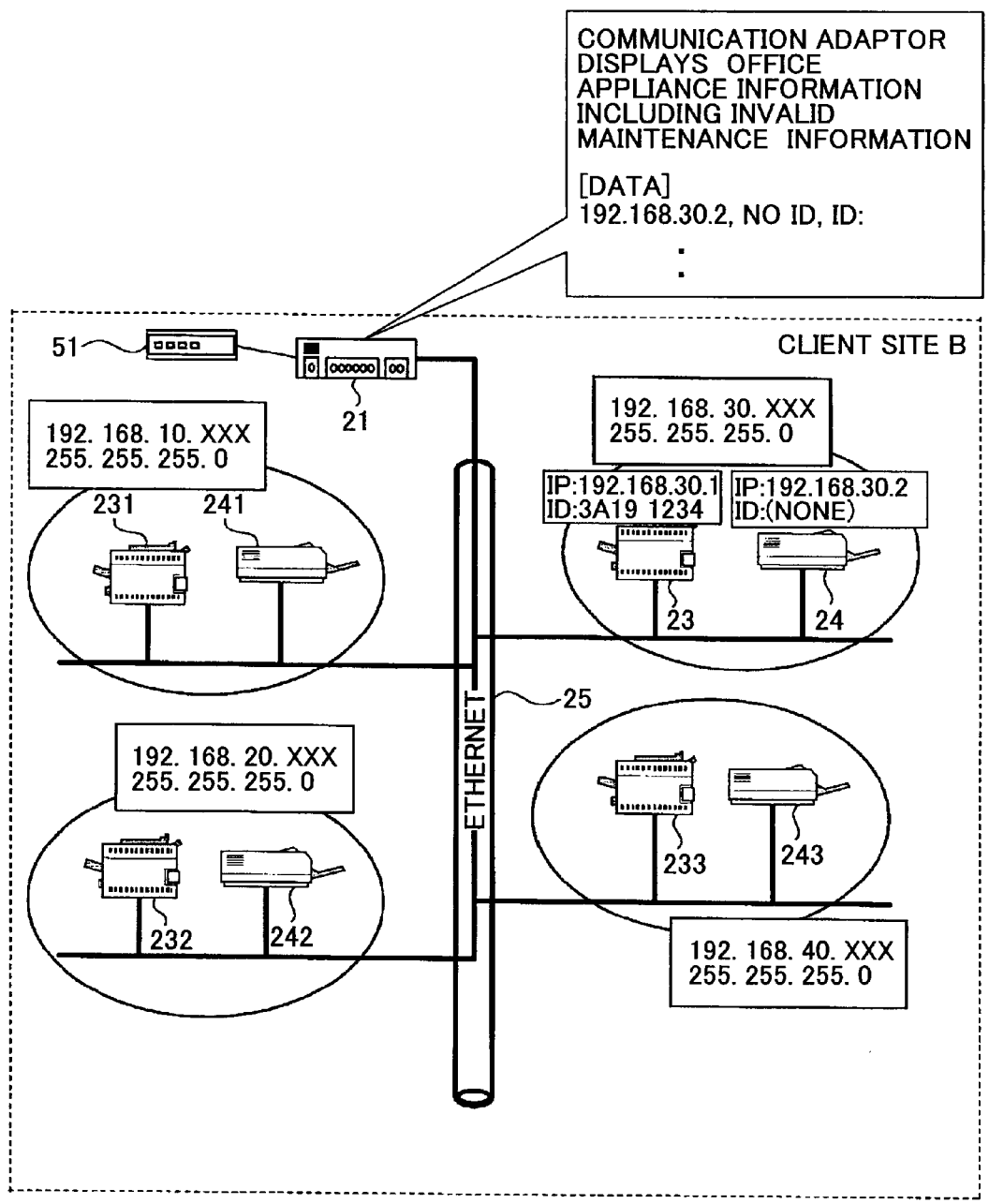
FIG. 8 is a drawing illustrating an exemplary communication process where the communication adaptor 21 displays office appliance information of an office appliance retaining invalid maintenance information.

FIG. 8 is a drawing illustrating an exemplary communication process where the communication adaptor 21 displays office appliance information of an office appliance retaining invalid maintenance information.

Figure 9:
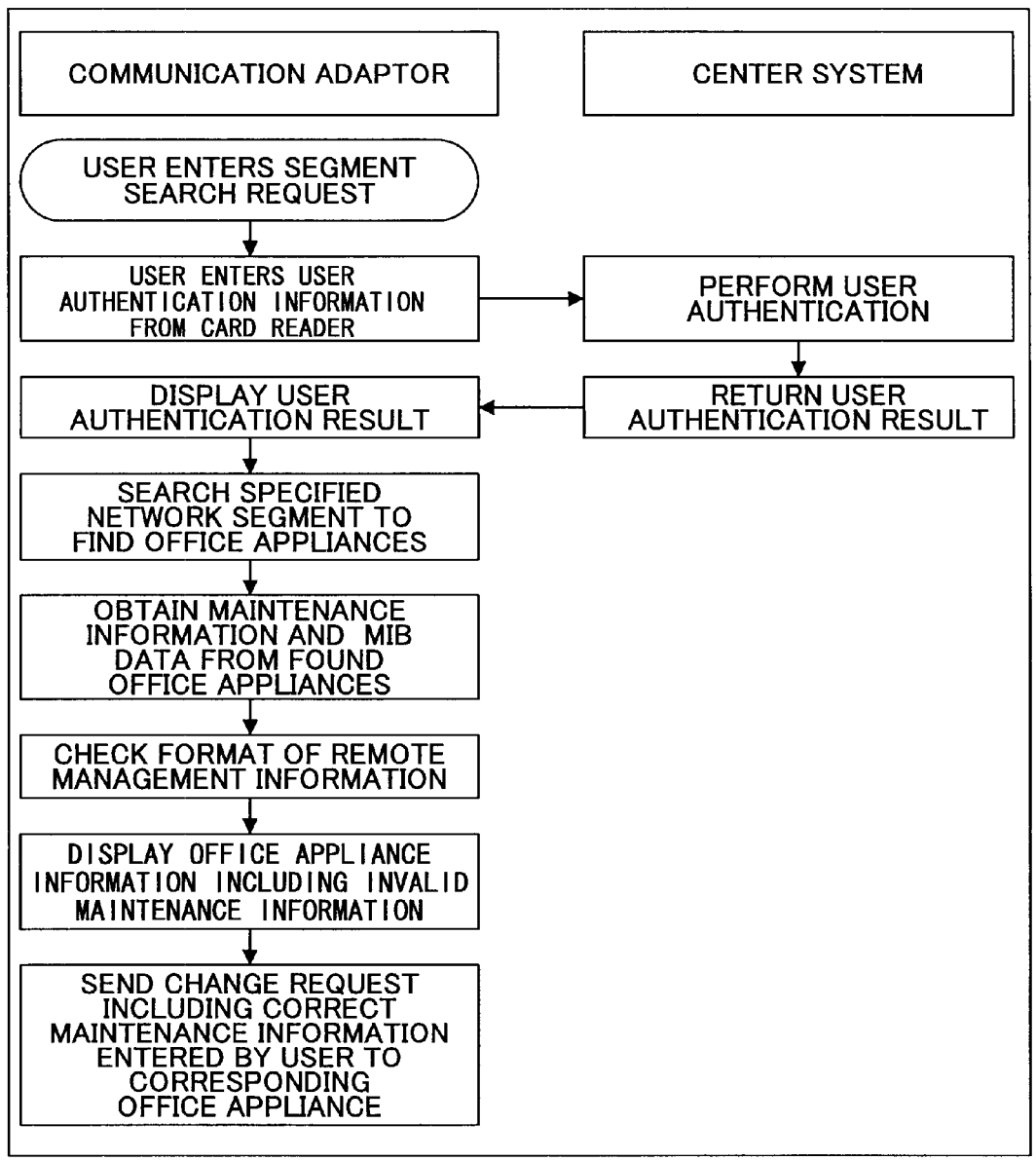
FIG. 9 is a flowchart showing a second exemplary communication process between the communication adaptor 21 and the center system 1 performed when a segment search request is generated in the communication adaptor 21.

FIG. 9 is a flowchart showing a second exemplary communication process between the communication adaptor 21 and the center system 1 performed when a segment search request is generated in the communication adaptor 21.

In the second embodiment, as shown in FIG. 8, the communication adaptor 21 is equipped with a card reader 51 for user authentication and is installed in the client site B where the network 25 is divided into multiple network segments.

As shown in FIG. 9, when a maintenance person (serviceperson), who is sent from an outside company to perform maintenance of office appliances on the network 25, enters a segment search request from (a touch panel of) the display unit 49, the CPU 44 of the communication adaptor 21 (hereafter, "the CPU 44 of the communication adaptor 21" may be simply referred to as "the communication adaptor 21") prompts the maintenance person to insert an IC card into (or hold an IC card over) the card reader 51 for user authentication. Alternatively, user authentication may be performed using an operations unit of the communication adaptor 21.

The card reader 51 reads user information (user authentication information) recorded in the IC card and sends the user information to the communication adaptor 21.

When receiving the user information, the communication adaptor 21 identifies the user based on the user information, and if the user is a maintenance person who is a privileged user, sends a user authentication request including the user information of the maintenance person to the center system 1 via HTTPS (encrypted communication).

When receiving the user authentication request from the communication adaptor 21, the CPU 31 of the server 3a of the center system 1 authenticates the user. Specifically, the CPU 31 compares the user information in the user authentication request with user authentication information (the latest user authentication information of maintenance persons) in a database in the HDD 37. If the user information in the user authentication request matches user authentication information in the HDD 37, the CPU 31 determines that the authentication has succeeded. If the user information does not match the user authentication information in the HDD 37, the CPU 31 determines that the authentication has failed. If the authentication has succeeded, the CPU 31 generates authentication result information including the authentication result (authentication succeeded) and maintenance rights of the maintenance person and sends the authentication result information to the communication adaptor 21 via HTTPS. If the authentication has failed, the CPU 31 generates authentication result information including the authentication result (authentication failed) and sends the authentication result information to the communication adaptor 21 via HTTPS. The CPU 31 also stores the authentication result in the HDD 37 as authentication history.

When receiving the authentication result information from the center system 1, the communication adaptor 21 displays the authentication result in the authentication result information on the display unit 49. Also, if the authentication result indicates that the authentication has succeeded, the communication adaptor 21 permits the maintenance person to operate (the touch panel of) the display unit 49.

Then, the maintenance person specifies a network segment on which maintenance is to be performed using the display unit 49 of the communication adaptor 21. Here, it is assumed that a network segment "192.168.30.0, subnet mask: 255.255.255.0" is specified.

The communication adaptor 21 searches the specified network segment to find office appliances. The communication adaptor 21 searches the specified network segment in substantially the same manner as described in the first embodiment.

From each of the found office appliances, the communication adaptor 21 obtains maintenance information (remote management information (remote management ID), a model name, a model number, and a device ID), for example, via a Web service over HTTPS, and also obtains other MIB data (e.g., "printerMIB" information) using SNMP. The communication adaptor 21 stores the obtained information (office appliance information or electronic device information) of the found office appliances in the RAM 46.

More specifically, as shown in FIG. 9, the communication adaptor 21 obtains maintenance information including remote management information (remote management ID), a model name, a model number, and a device ID from each of the found office appliances, for example, via a Web service over HTTPS, and also obtains other MIB data (e.g., "printerMIB" information) from each of the found office appliances using SNMP. Next, the communication adaptor 21 checks the remote management information (remote management ID) of each of the office appliances and determines whether the remote management information is in a predetermined format (or valid). Details of this step are substantially the same as those described in the first embodiment.

If the remote management information is invalid, the communication adaptor 21 determines that the maintenance information including the invalid remote management information is invalid, and stores the office appliance information (including the invalid maintenance information and other MID data) of the corresponding office appliance in the RAM 46. Then, the communication adaptor 21 displays (reports) the office appliance information on the display unit 49.

The maintenance person checks the office appliance information displayed on the display unit 49, determines correct maintenance information (including correct remote management information), and enters the correct maintenance information on the display unit 49.

The communication adaptor 21 sends a change request including the correct maintenance information to the office appliance retaining the invalid maintenance information.

When receiving the change request, the CPU of the office appliance writes the correct maintenance information into its non-volatile memory (overwrites the invalid maintenance information with the correct maintenance information). For example, assuming that the copier 23 retains invalid maintenance information, the CPU 101 of the copier 23 writes the correct maintenance information into the RAM 103.

Thus, according to the second embodiment, when user authentication information is entered by a user, a communication adaptor identifies the user based on the user authentication information, and if the user is a privileged user, sends a user authentication request including the user authentication information of the user to a center system. When receiving the user authentication request from the communication adaptor, the center system compares the user authentication information in the user authentication request with current user authentication information (latest user authentication information of privileged users) in a database. The center system determines that the authentication has succeeded if it finds matching user authentication information in the database and determines that the authentication has failed if there is no matching user authentication information in the database. The center system sends the authentication result to the communication adaptor. If the authentication result indicates that the authentication has succeeded, the communication adaptor searches a specified network segment to find office appliances, obtains remote management information from the found office appliances, and determines whether the obtained remote management information of each of the found office appliances is in a predetermined format (or valid). If the obtained remote management information is invalid, the communication adaptor reports the maintenance information of the office appliance retaining the invalid remote management information to the user. When updated (, new, or correct) remote management information is entered by the user, the communication adaptor sends a change request including the updated remote management information to the corresponding office appliance, and thereby requests the office appliance to overwrite the invalid remote management information with the updated remote management information. This configuration or mechanism provides substantially the same advantageous effects as those of the first embodiment. Also, authenticating users or maintenance persons by the center system prevents unauthorized access (e.g., by retired personnel) and thereby improves security of a remote maintenance system.

Third Embodiment

Next, a third embodiment of the present invention is described.

As shown in FIG. 5, the communication adaptor 21 is installed in the client site B where the network 25 is divided into multiple network segments. Here, it is assumed that a network segment "192.168.30.0, subnet mask: 255.255.255.0" is specified as a target network segment to be managed, the specified network segment is searched to find office appliances once a day at 0:00 a.m., and office appliance information of the found office appliances in the network segment is sent to the center system 1 once a week on Sunday at 0:00 a.m. It is also assumed that if a status change of an office appliance in the network segment is detected, the communication adaptor 21 immediately sends the office appliance information of the office appliance to the center system 1.

The CPU 44 of the communication adaptor 21 (hereafter, "the CPU 44 of the communication adaptor 21" may be simply referred to as "the communication adaptor 21") of the third embodiment performs a process as described in the first embodiment when a segment search request is generated. Also, the communication adaptor 21 of this embodiment obtains, in addition to the maintenance information, device status information including operational information, device status, and setting information of office appliances in a specified network segment (e.g., once a day at 0:00 a.m.).

The communication apparatus 21 detects changes in status of the office appliances based on the obtained device status information. If a status change (such as a malfunction) that necessitates maintenance of an office appliance is detected, the communication apparatus 21 sends status change information indicating the status change of the office appliance to the center system 1.

When receiving the status change information from the communication adaptor 21, the CPU 31 of the server 3a of the center system 1 stores the status change information in the HDD 37 and displays the status change information on the display unit of a terminal connected to the server 3a.

An operator checks the status change information on the display unit and calls a maintenance person.

The above function of the communication adaptor 21 for detecting a status change of an office appliance in a network segment and reporting the status change to the center system 1 may also be applied to the second embodiment and fourth and succeeding embodiments described later.

Thus, according to the third embodiment, a communication adaptor searches a specified network segment to find office appliances, obtains office appliance information including device status information such as operational information, device status, and setting information from the found office appliances, and if invalid maintenance information is found, sends the office appliance information including the invalid maintenance information and the device status information to a center system. This configuration or mechanism makes it possible for the center system to monitor the status of office appliances. This in turn makes it possible to arrange office appliances freely and thereby to improve the efficiency of maintaining the office appliances.

Also, a communication adaptor of the third embodiment detects changes in status of the office appliances based on the device status information, and if a status change (such as a malfunction) that necessitates maintenance of an office appliance is detected, sends status change information indicating the status change of the office appliance to the center system. This configuration or mechanism makes it possible to reduce the workload of a network administrator of a client site in managing office appliances.

Fourth Embodiment

Next, a fourth embodiment of the present invention is described.

Figure 10:
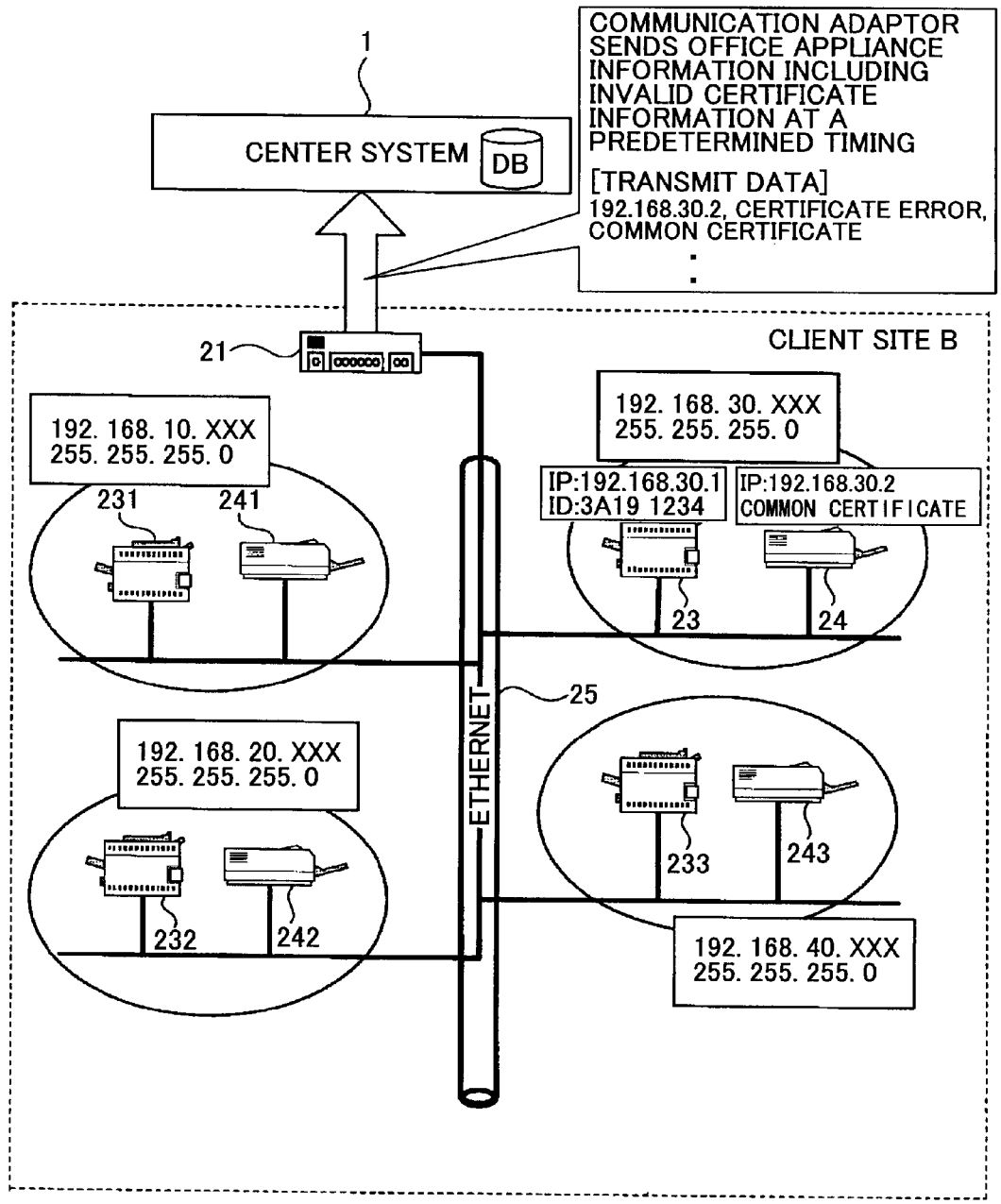
FIG. 10 is a drawing illustrating an exemplary communication process where the communication adaptor 21 sends office appliance information including invalid certificate information to the center system 1.

FIG. 10 is a drawing illustrating an exemplary communication process where the communication adaptor 21 sends office appliance information including invalid certificate information to the center system 1.

Figure 11:
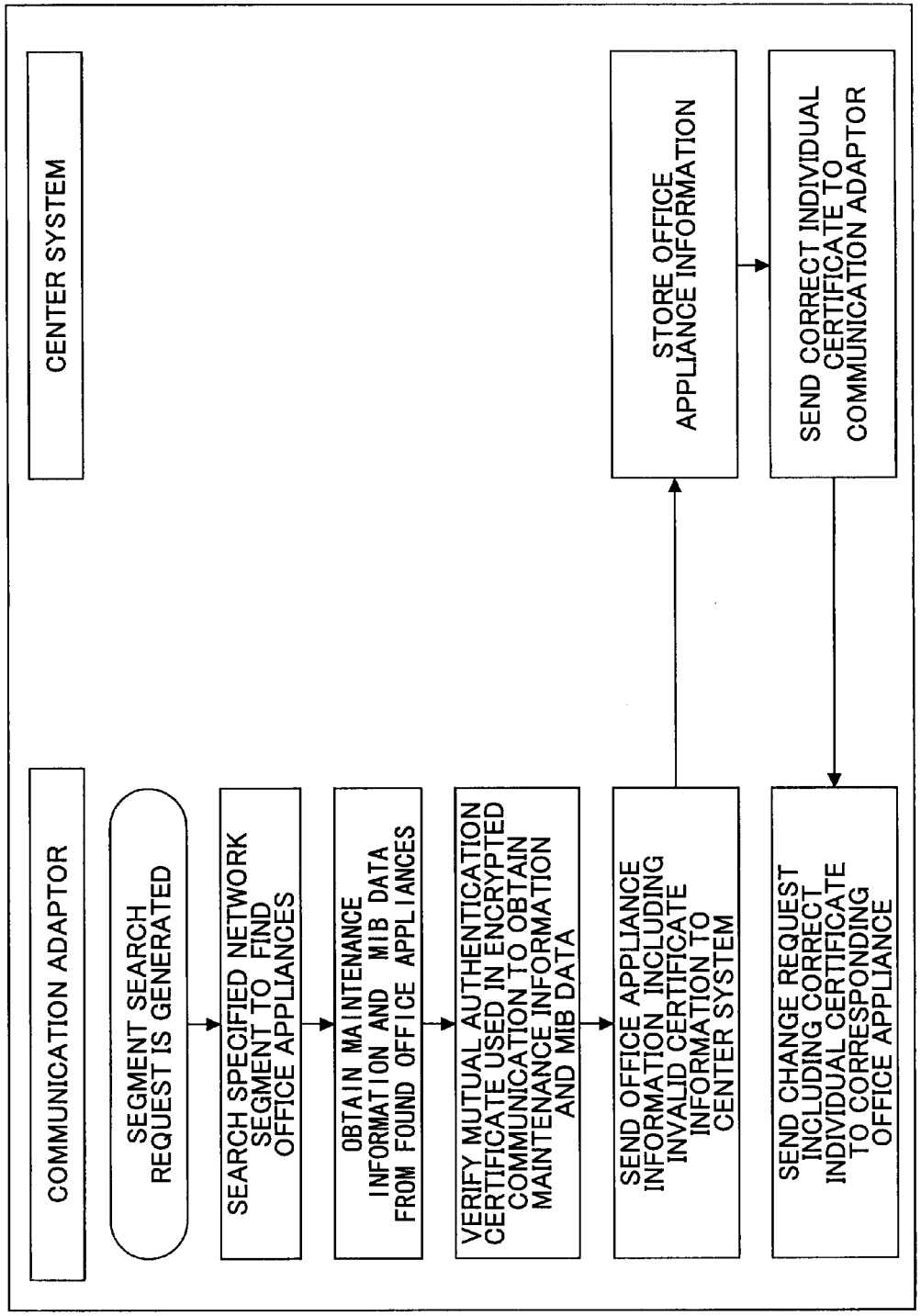
FIG. 11 is a flowchart showing a third exemplary communication process between the communication adaptor 21 and the center system 1 performed when a segment search request is generated in the communication adaptor 21.

FIG. 11 is a flowchart showing a third exemplary communication process between the communication adaptor 21 and the center system 1 performed when a segment search request is generated in the communication adaptor 21.

As shown in FIG. 10, the communication adaptor 21 is installed in the client site B where the network 25 is divided into multiple network segments. Here, it is assumed that a network segment "192.168.30.0, subnet mask: 255.255.255.0" is specified as a target network segment to be managed, the specified network segment is searched to find office appliances once a day at 0:00 a.m., and office appliance information of the found office appliances in the network segment is sent to the center system 1 once a week on Sunday at 0:00 a.m.

When a segment search request is generated at a search timing "once a day at 0:00 a.m.", the CPU 44 of the communication adaptor 21 (hereafter, "the CPU 44 of the communication adaptor 21" may be simply referred to as "the communication adaptor 21") searches the network segment "192.168.30.0, subnet mask: 255.255.255.0" to find office appliances. The communication adaptor 21 searches the specified network segment in substantially the same manner as described in the first embodiment.

From each of the found office appliances, the communication adaptor 21 obtains maintenance information (remote management information (remote management ID), a model name, a model number, and a device ID), for example, via a Web service over HTTPS, and also obtains other MIB data (e.g., "printerMIB" information) using SNMP. The communication adaptor 21 sends the obtained information (office appliance information or electronic device information) of the found office appliances to the center system 1.

More specifically, as shown in FIG. 11, the communication adaptor 21 obtains maintenance information including remote management information (remote management ID), a model name, a model number, and a device ID from each of the found office appliances, for example, via a Web service over HTTPS, and also obtains other MIB data (e.g., "printerMIB" information) from each of the found office appliances using SNMP. In the fourth embodiment, the maintenance information and other MIB data (office appliance information or electronic device information) are obtained using encrypted communication. In this process, the communication adaptor 21 verifies a mutual authentication certificate (hereafter, may simply be called a certificate) used in the encrypted communication. An office appliance may retain an individual certificate used as the mutual authentication certificate and/or a common certificate. An individual certificate includes identification information of an electronic device and a common certificate includes identification information for identifying a group of electronic devices to be managed.

If an office appliance has no certificate (i.e., if the office appliance is unable to perform mutual authentication) or if its certificate is not an individual certificate but a common certificate, the communication adaptor 21 sends office appliance information of the office appliance as invalid office appliance information to the center system 1. In this case, the invalid office appliance information includes invalid certificate information (the common certificate or certificate error information indicating that no certificate is available).

When receiving the invalid office appliance information from the communication adaptor 21, the CPU 31 of the server 3a of the center system 1 stores the invalid office appliance information (in a database) in the HDD 37. Then, the CPU 31 displays the invalid office appliance information on a display unit of a terminal connected to the server 3a.

An operator checks the displayed office appliance information, determines a correct individual certificate, and enters the correct individual certificate on the display unit or from an input unit of the terminal.

The CPU 31 of the server 3a sends the correct individual certificate to the communication adaptor 21.

Alternatively, the server 3a may perform a process as described below when invalid office appliance information including invalid certificate information (a common certificate or certificate error information) is received from the communication adaptor 21. In the alternative process, the CPU 31 of the server 3a searches a database in the HDD 37 for office appliance information corresponding to the received office appliance information based on, for example, the MIB data in the received office appliance information. If matching office appliance information is found, the CPU 31 automatically determines a correct individual certificate to be sent to the communication adaptor 21 based on the found office appliance information.

When receiving the correct individual certificate from the center system 1, the communication adaptor 21 sends a change request including the correct individual certificate to the office appliance having the invalid or no certificate (i.e., to the office appliance retaining the invalid office appliance information) via encrypted communication using the common certificate.

When receiving the change request, the CPU of the office appliance writes the correct individual certificate contained in the change request into its non-volatile memory. For example, assuming that the copier 23 has an invalid or no certificate, the CPU 101 of the copier 23 writes the correct individual certificate into the RAM 103.

Thus, according to the fourth embodiment, a communication adaptor searches a specified network segment to find office appliances, and obtains office appliance information from the found office appliances via encrypted communication using an individual certificate as a mutual authentication certificate. In this process, the communication adaptor verifies the mutual authentication certificate used in the encrypted communication, and if the mutual authentication certificate of an office appliance is invalid (is not a valid individual certificate), sends office appliance information of the office appliance as invalid office appliance information to a center system. In response to the invalid office appliance information, a management apparatus in the center system sends a correct individual certificate to the communication adaptor. The communication adaptor sends a change request including the correct individual certificate to the corresponding office appliance via encrypted communication using a common certificate and thereby requests the office appliance to replace the invalid individual certificate with the correct individual certificate. This configuration or mechanism provides substantially the same advantageous effects as those of the first embodiment and also improves security of a remote maintenance system.

Fifth Embodiment

Next, a fifth embodiment of the present invention is described.

Figure 12:
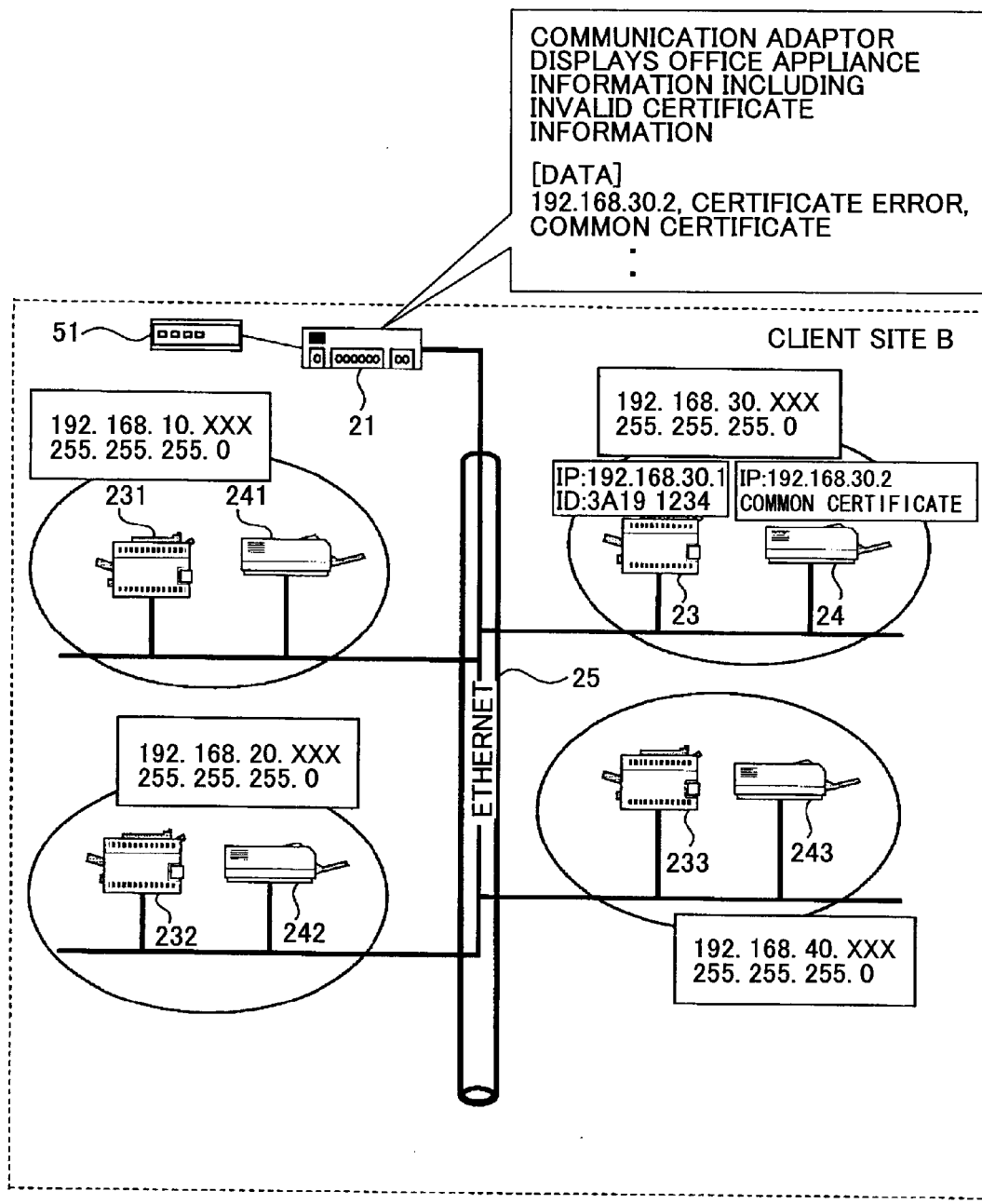
FIG. 12 is a drawing illustrating an exemplary communication process where the communication adaptor 21 displays office appliance information including invalid certificate information.

FIG. 12 is a drawing illustrating an exemplary communication process where the communication adaptor 21 displays office appliance information including invalid certificate information.

Figure 13:
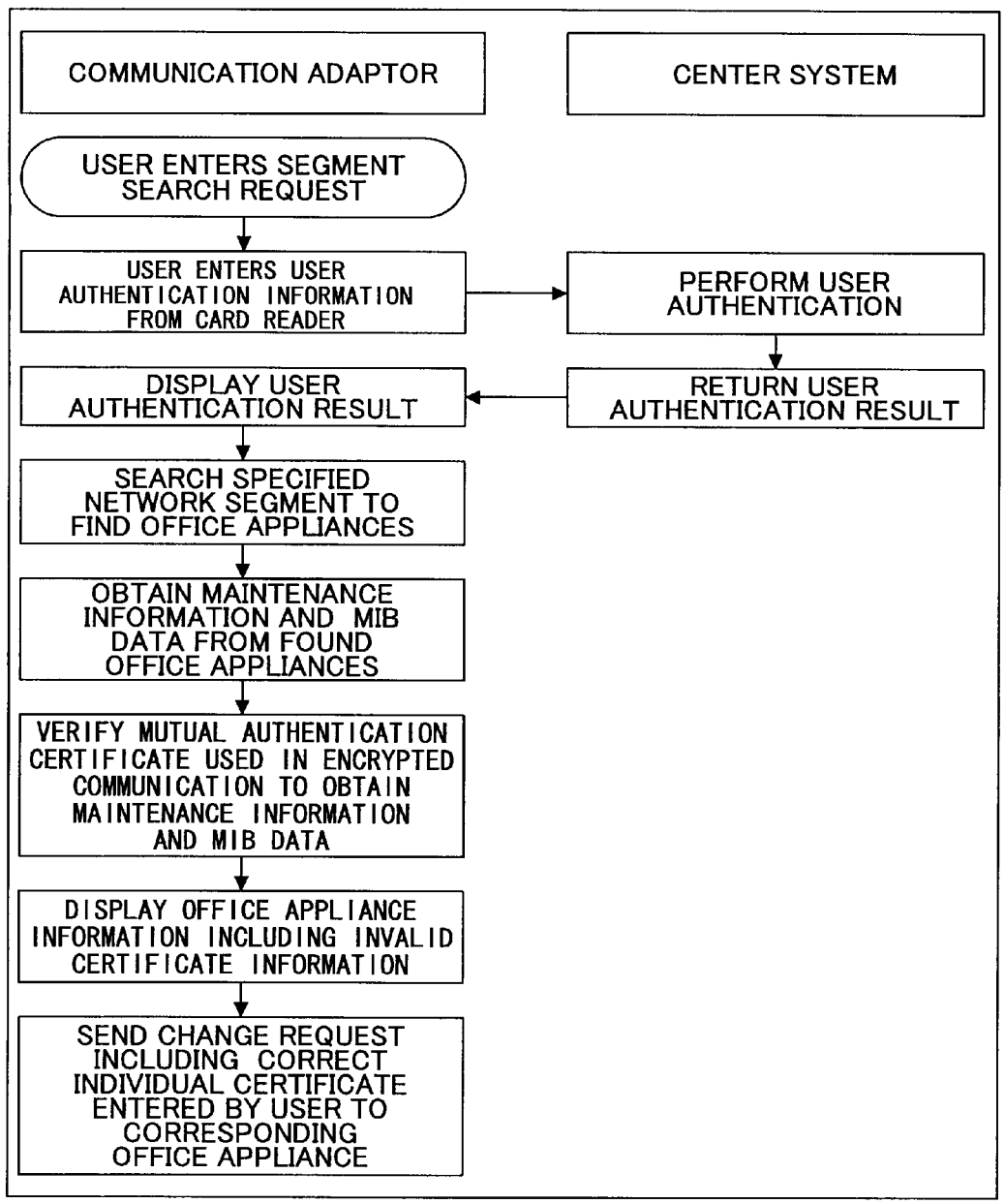
FIG. 13 is a flowchart showing a fourth exemplary communication process between the communication adaptor 21 and the center system 1 performed when a segment search request is generated in the communication adaptor 21.

FIG. 13 is a flowchart showing a fourth exemplary communication process between the communication adaptor 21 and the center system 1 performed when a segment search request is generated in the communication adaptor 21.

In the fifth embodiment, as shown in FIG. 12, the communication adaptor 21 is equipped with the card reader 51 for user authentication and is installed in the client site B where the network 25 is divided into multiple network segments.

As shown in FIG. 13, when a maintenance person (serviceperson), who is sent from an outside company to perform maintenance of office appliances on the network 25, enters a segment search request from (a touch panel of) the display unit 49, the CPU 44 of the communication adaptor 21 (hereafter, "the CPU 44 of the communication adaptor 21" may be simply referred to as "the communication adaptor 21") prompts the maintenance person to insert an IC card into (or hold an IC card over) the card reader 51 for user authentication. Alternatively, user authentication may be performed using an operations unit of the communication adaptor 21

When receiving authentication result information including an authentication result from the center system 1, the communication adaptor 21 displays the authentication result on the display unit 49, and if the authentication result indicates that the authentication has succeeded, the communication adaptor 21 permits the maintenance person to operate (the touch panel of) the display unit 49. This authentication process is substantially the same as described in the second embodiment.

Then, the maintenance person specifies a network segment on which maintenance is to be performed using the display unit 49 of the communication adaptor 21. Here, it is assumed that a network segment "192.168.30.0, subnet mask: 255.255.255.0" is specified.

The communication adaptor 21 searches the specified network segment to find office appliances. The communication adaptor 21 searches the specified network segment in substantially the same manner as described in the first embodiment.

From each of the found office appliances, the communication adaptor 21 obtains maintenance information (remote management information (remote management ID), a model name, a model number, and a device ID), for example, via a Web service over HTTPS, and also obtains other MIB data (e.g., "printerMIB" information) using SNMP. The communication adaptor 21 stores the obtained information (office appliance information or electronic device information) of the found office appliances in the RAM 46.

More specifically, as shown in FIG. 13, the communication adaptor 21 obtains maintenance information including remote management information (remote management ID), a model name, a model number, and a device ID from each of the found office appliances, for example, via a Web service over HTTPS, and also obtains other MIB data (e.g., "printerMIB" information) from each of the found office appliances using SNMP. In the fifth embodiment, the maintenance information and other MIB data (office appliance information or electronic device information) are obtained using encrypted communication. In this process, the communication adaptor 21 verifies a mutual authentication certificate used in the encrypted communication.

If an office appliance has no certificate (i.e., if the office appliance is unable to perform mutual authentication) or if its certificate is not an individual certificate but a common certificate, the communication adaptor 21 stores office appliance information of the office appliance as invalid office appliance information in the RAM 46. In this case, the invalid office appliance information includes invalid certificate information (the common certificate or certificate error information indicating that no certificate is available). Then, the communication adaptor 21 displays (reports) the invalid office appliance information on the display unit 49.

The maintenance person checks the invalid office appliance information displayed on the display unit 49, determines a correct individual certificate, and enters the correct individual certificate from the display unit 49.

The communication adaptor 21 sends a change request including the correct individual certificate to the office appliance having the invalid or no certificate (i.e., to the office appliance retaining the invalid office appliance information) via encrypted communication using the common certificate.

When receiving the change request, the CPU of the office appliance writes the correct individual certificate contained in the change request into its non-volatile memory. For example, assuming that the copier 23 has an invalid or no certificate, the CPU 101 of the copier 23 writes the correct individual certificate into the RAM 103.

Thus, according to the fifth embodiment, when user authentication information is entered by a user, a communication adaptor identifies the user based on the user authentication information, and if the user is a privileged user, sends a user authentication request including the user authentication information of the user to a center system. When receiving the user authentication request from the communication adaptor, the center system compares the user authentication information in the user authentication request with user authentication information (user authentication information of privileged users) in a database. The center system determines that the authentication has succeeded if it finds matching user authentication information in the database and determines that the authentication has failed if there is no matching user authentication information in the database. The center system sends the authentication result to the communication adaptor. If the authentication result indicates that the authentication has succeeded, the communication adaptor searches a specified network segment to find office appliances, and obtains office appliance information from the found office appliances via encrypted communication using an individual certificate as a mutual authentication certificate. In this process, the communication adaptor verifies the mutual authentication certificate used in the encrypted communication, and if the mutual authentication certificate of an office appliance is invalid (is not a valid individual certificate), reports office appliance information of the office appliance as invalid office appliance information to the user. When a correct individual certificate is entered by the user, the communication adaptor sends a change request including the correct individual certificate to the corresponding office appliance via encrypted communication using a common certificate and thereby requests the office appliance to replace the invalid individual certificate with the correct individual certificate. This configuration or mechanism provides substantially the same advantageous effects as those of the second embodiment and also improves security of a remote maintenance system.

Sixth Embodiment

Next, a sixth embodiment of the present invention is described.

Figure 14:
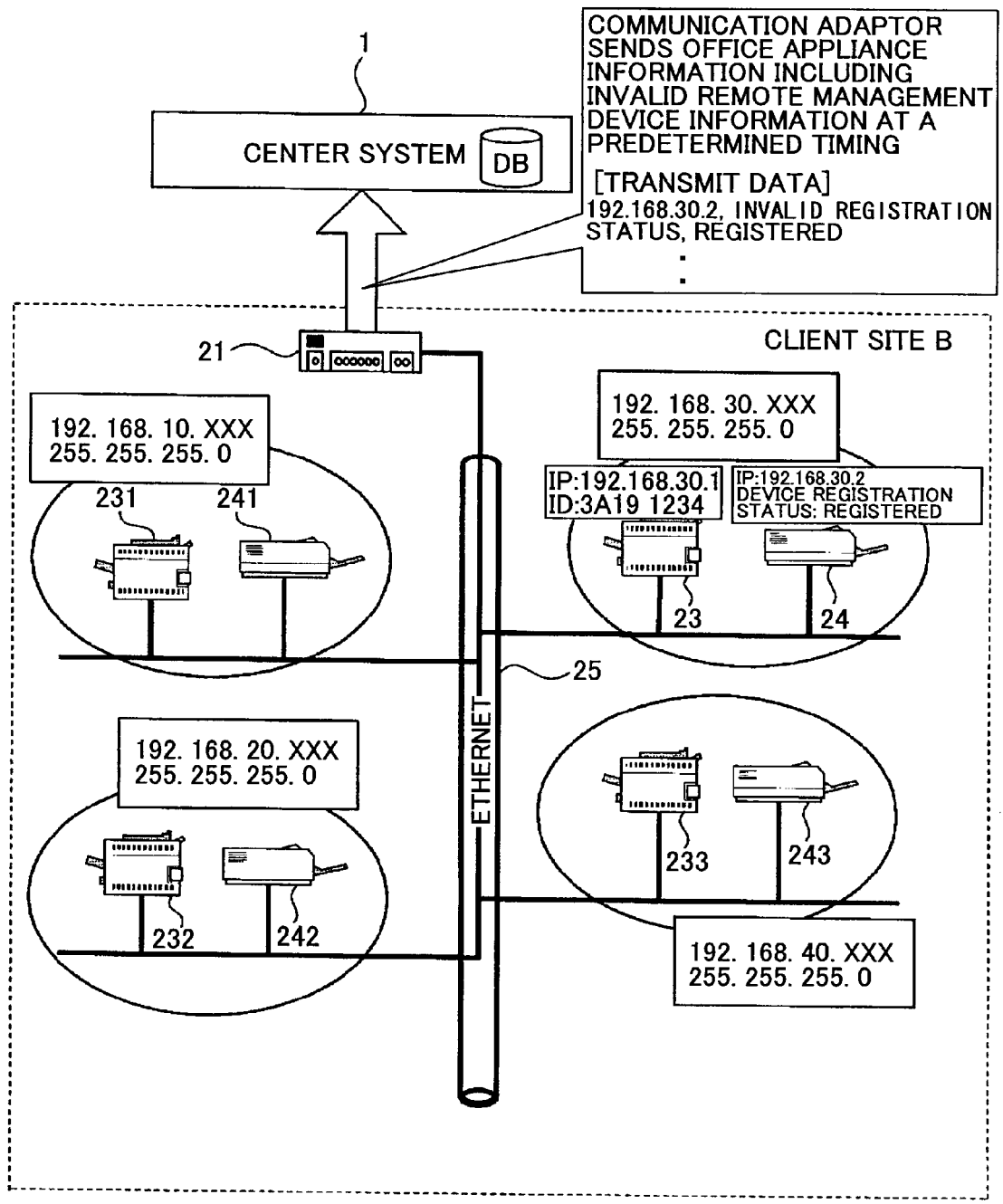
FIG. 14 is a drawing illustrating an exemplary communication process where the communication adaptor 21 sends office appliance information including invalid remote management device information to the center system 1.

FIG. 14 is a drawing illustrating an exemplary communication process where the communication adaptor 21 sends office appliance information including invalid remote management device information to the center system 1.

Figure 15:
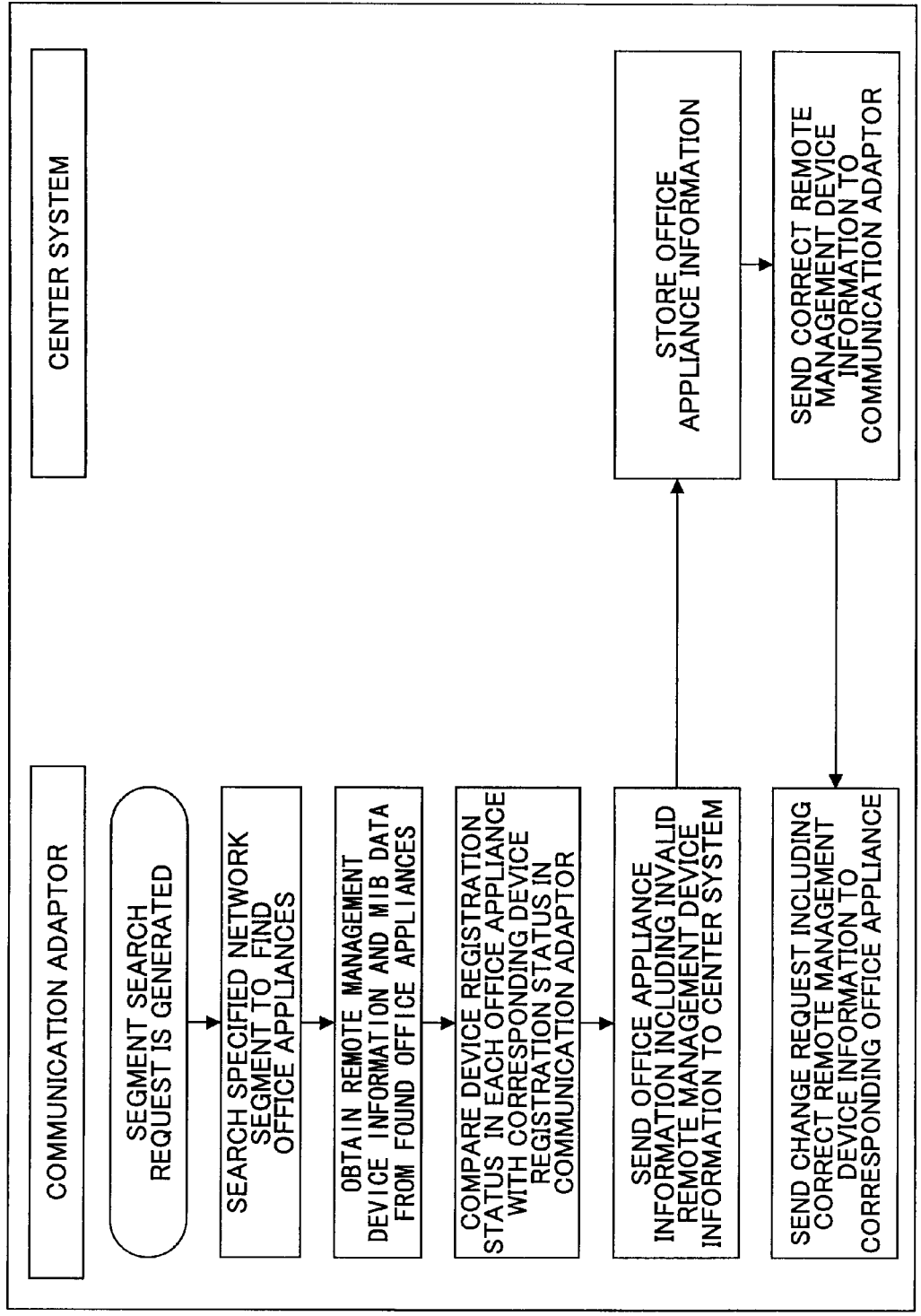
FIG. 15 is a flowchart showing a fifth exemplary communication process between the communication adaptor 21 and the center system 1 performed when a segment search request is generated in the communication adaptor 21.

FIG. 15 is a flowchart showing a fifth exemplary communication process between the communication adaptor 21 and the center system 1 performed when a segment search request is generated in the communication adaptor 21.

As shown in FIG. 14, the communication adaptor 21 is installed in the client site B where the network 25 is divided into multiple network segments. Here, it is assumed that a network segment "192.168.30.0, subnet mask: 255.255.255.0" is specified as a target network segment to be managed, the specified network segment is searched to find office appliances once a day at 0:00 a.m., and office appliance information of the found office appliances in the network segment is sent to the center system 1 once a week on Sunday at 0:00 a.m.

When a segment search request is generated at a search timing "once a day at 0:00 a.m.", the CPU 44 of the communication adaptor 21 (hereafter, "the CPU 44 of the communication adaptor 21" may be simply referred to as "the communication adaptor 21") searches the network segment "192.168.30.0, subnet mask: 255.255.255.0" to find office appliances. The communication adaptor 21 searches the specified network segment in substantially the same manner as described in the first embodiment.

From each of the found office appliances, the communication adaptor 21 obtains remote management device information (including an IP address of the communication adaptor 21 that manages the found office appliances), for example, via a Web service over HTTPS, and also obtains other MIB data (e.g., "printerMIB" information) using SNMP. The communication adaptor 21 sends the obtained information (office appliance information or electronic device information) of the found office appliances to the center system 1.

More specifically, as shown in FIG. 15, the communication adaptor 21 obtains remote management device information (including an IP address of the communication adaptor 21) from each of the found office appliances, for example, via a Web service over HTTPS, and also obtains other MIB data (e.g., "printerMIB" information) from each of the found office appliances using SNMP. The communication adaptor 21 then obtains a device registration status from the remote management device information of each of the found office appliances and compares the obtained device registration status with the corresponding device registration status (in the remote management device information) stored in the RAM 46.

If the device registration statuses do not match (if the obtained device registration status is invalid), the communication adaptor 21 determines that the remote management device information is invalid, and sends the office appliance information (including the invalid remote management device information and other MIB data) of the corresponding office appliance to the center system 1.

When receiving the office appliance information from the communication adaptor 21, the CPU 31 of the server 3a of the center system 1 stores the received office appliance information (in a database) in the HDD 37. Then, the CPU 31 displays the office appliance information on a display unit of a terminal connected to the server 3a.

An operator checks the displayed office appliance information, determines correct remote management device information including a correct device registration status for the office appliance, and enters the correct remote management device information on the display unit or from an input unit of the terminal.

The CPU 31 of the server 3a sends the correct remote management device information to the communication adaptor 21.

Alternatively, the server 3a may perform a process described below when office appliance information including invalid remote management device information is received from the communication adaptor 21. In the alternative process, the CPU 31 of the server 3a searches a database in the HDD 37 for office appliance information corresponding to the received office appliance information based on, for example, the MIB data in the received office appliance information. If matching office appliance information is found, the CPU 31 automatically determines correct remote management device information including a correct device registration status to be sent to the communication adaptor 21 based on the found office appliance information.

When receiving the correct remote management device information from the center system 1, the communication adaptor 21 sends a change request including the correct remote management device information to the corresponding office appliance.

When receiving the change request, the CPU of the office appliance writes the correct remote management device information into its non-volatile memory (overwrites the invalid remote management device information with the correct remote management device information). For example, assuming that the copier 23 has invalid remote management device information, the CPU 101 of the copier 23 writes the correct remote management device information into the RAM 103.

Thus, according to the sixth embodiment, a communication adaptor searches a specified network segment to find office appliances, obtains remote management device information from each of the found office appliances, compares the obtained remote management device information with current remote management device information in the communication adaptor, and thereby determines whether the obtained remote management device information is valid. If the obtained remote management device information is invalid, the communication adaptor sends office appliance information of the office appliance retaining the invalid remote management device information to a center system. In response to the office appliance information, the center system returns correct remote management device information to the communication adaptor. The communication adaptor sends a change request including the correct remote management device information to the office appliance retaining the invalid remote management device information, and the office appliance overwrites the invalid remote management device information with the correct remote management device information. This configuration or mechanism provides substantially the same advantageous effects as those of the first embodiment.

Seventh Embodiment

Next, a seventh embodiment of the present invention is described.

Figure 16:
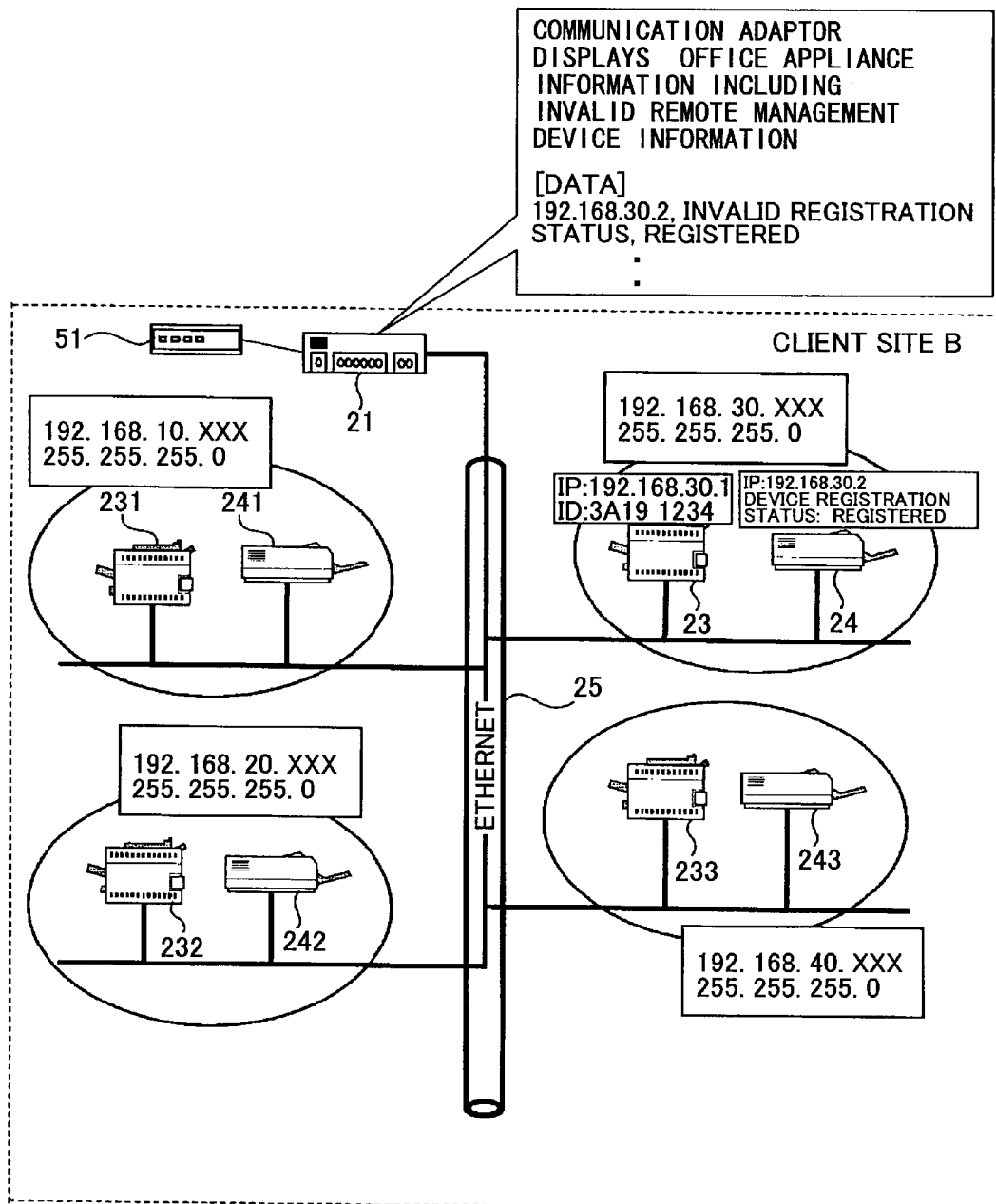
FIG. 16 is a drawing illustrating an exemplary communication process where the communication adaptor 21 displays office appliance information of an office appliance retaining invalid remote management device information.

FIG. 16 is a drawing illustrating an exemplary communication process where the communication adaptor 21 displays office appliance information of an office appliance retaining invalid remote management device information.

Figure 17:
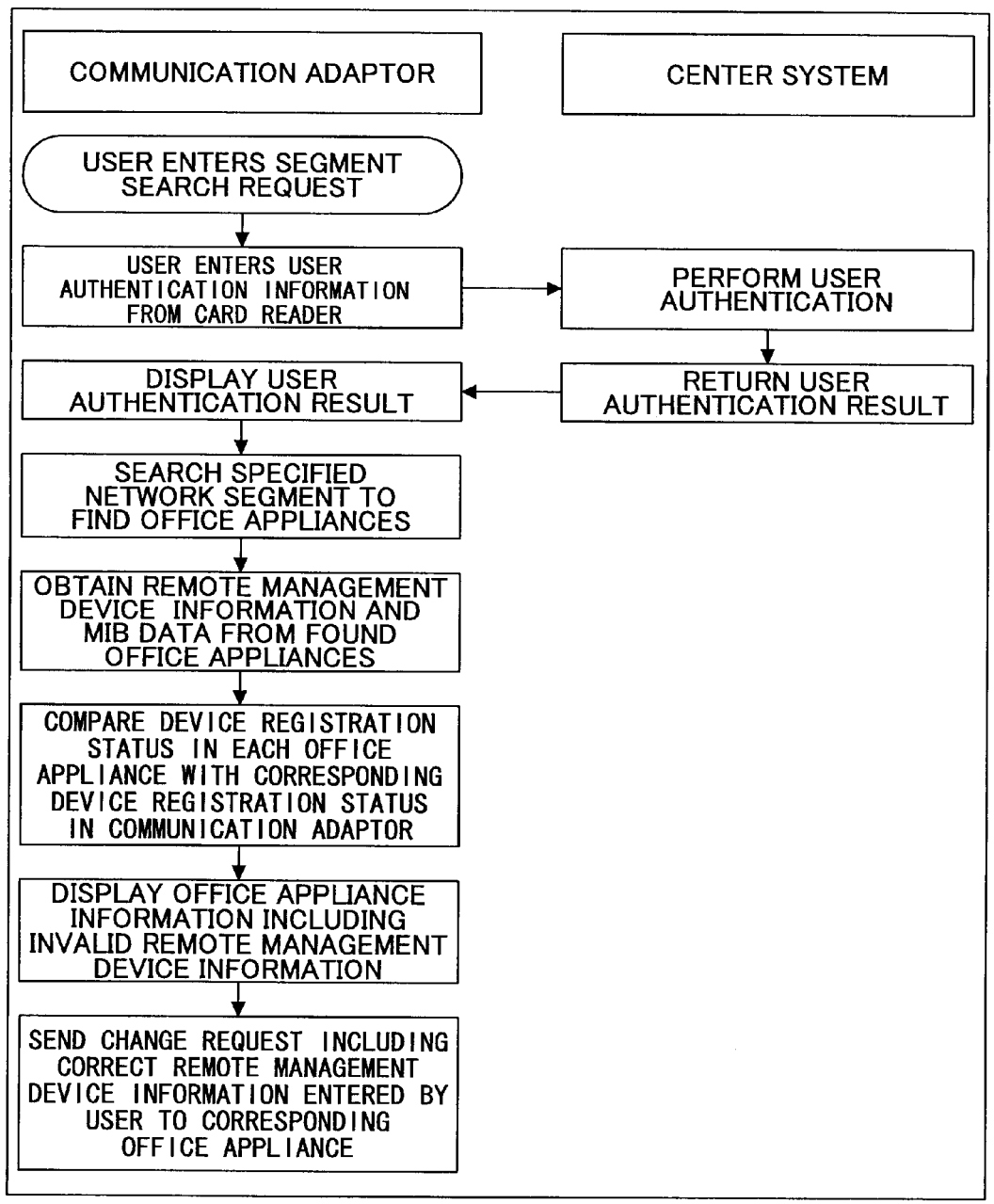
FIG. 17 is a flowchart showing a sixth exemplary communication process between the communication adaptor 21 and the center system 1 performed when a segment search request is generated in the communication adaptor 21.

FIG. 17 is a flowchart showing a sixth exemplary communication process between the communication adaptor 21 and the center system 1 performed when a segment search request is generated in the communication adaptor 21.

In the seventh embodiment, as shown in FIG. 16, the communication adaptor 21 is equipped with the card reader 51 for user authentication and is installed in the client site B where the network 25 is divided into multiple network segments.

As shown in FIG. 17, when a maintenance person (serviceperson), who is sent from an outside company to perform maintenance of office appliances on the network 25, enters a segment search request from (a touch panel of) the display unit 49, the CPU 44 of the communication adaptor 21 (hereafter, "the CPU 44 of the communication adaptor 21" may be simply referred to as "the communication adaptor 21") prompts the maintenance person to insert an IC card into (or hold an IC card over) the card reader 51 for user authentication. Alternatively, user authentication may be performed using an operations unit of the communication adaptor 21.

When receiving authentication result information including an authentication result from the center system 1, the communication adaptor 21 displays the authentication result on the display unit 49, and if the authentication result indicates that the authentication has succeeded, the communication adaptor 21 permits the maintenance person to operate (the touch panel of) the display unit 49. This authentication process is substantially the same as described in the second embodiment.

Then, the maintenance person specifies a network segment on which maintenance is to be performed using the display unit 49 of the communication adaptor 21. Here, it is assumed that a network segment "192.168.30.0, subnet mask: 255.255.255.0" is specified.

The communication adaptor 21 searches the specified network segment to find office appliances. The communication adaptor 21 searches the specified network segment in substantially the same manner as described in the first embodiment.

From each of the found office appliances, the communication adaptor 21 obtains remote management device information (including an IP address of the communication adaptor 21 that manages the found office appliances), for example, via a Web service over HTTPS, and also obtains other MIB data (e.g., "printerMIB" information) using SNMP. The communication adaptor 21 stores the obtained information (office appliance information or electronic device information) of the found office appliances in the RAM 46.

More specifically, as shown in FIG. 17, the communication adaptor 21 obtains remote device management information (including an IP address of the communication adaptor 21) from each of the found office appliances, for example, via a Web service over HTTPS, and also obtains other MIB data (e.g., "printerMIB" information) from each of the found office appliances using SNMP. The communication adaptor 21 then obtains a device registration status from the remote management device information of each of the found office appliances and compares the obtained device registration status with the corresponding device registration status (in the remote management device information) stored in the RAM 46.

If the device registration statuses do not match (if the obtained device registration status is invalid), the communication adaptor 21 determines that the remote management device information is invalid, and stores the office appliance information (including the invalid remote management device information and other MIB data) of the corresponding office appliance in the RAM 46. Then, the communication adaptor 21 displays (reports) the office appliance information on the display unit 49.

The maintenance person checks the office appliance information displayed on the display unit 49, determines correct remote management device information including a correct device registration status for the corresponding office appliance, and enters the correct remote management device information on the display unit 49.

The communication adaptor 21 sends a change request including the correct remote management device information to the corresponding office appliance.

When receiving the change request, the CPU of the office appliance writes the correct remote management device information into its non-volatile memory (overwrites the invalid remote management device information with the correct remote management device information). For example, assuming that the copier 23 has invalid remote management device information, the CPU 101 of the copier 23 writes the correct remote management device information into the RAM 103.

Thus, according to the seventh embodiment, when user authentication information is entered by a user, a communication adaptor identifies the user based on the user authentication information, and if the user is a privileged user, sends a user authentication request including the user authentication information of the user to a center system. When receiving the user authentication request from the communication adaptor, the center system compares the user authentication information in the user authentication request with current user authentication information (latest user authentication information of privileged users) in a database. The center system determines that the authentication has succeeded if it finds matching user authentication information in the database and determines that the authentication has failed if it does not find matching user authentication information in the database. The center system sends the authentication result to the communication adaptor. If the authentication result indicates that the authentication has succeeded, the communication adaptor searches a specified network segment to find office appliances, obtains remote management device information from each of the found office appliances, compares the obtained remote management device information with current remote management device information in the communication adaptor, and thereby determines whether the obtained remote management device information is valid. If the obtained remote management device information is invalid, the communication adaptor reports the office appliance information of the corresponding office appliance to the user. When correct remote management device information is entered by the user, the communication adaptor sends a change request including the correct remote management device information to the corresponding office appliance, and thereby requests the office appliance to overwrite the invalid remote management device information with the correct remote management device information. This configuration or mechanism provides substantially the same advantageous effects as those of the second embodiment.

Thus, embodiments of the present invention make it possible to promptly detect problems in a remote management system caused, for example, by changing the layout of office appliances. This in turn reduces the workload of a network administrator in managing office appliances as well as the workload of a maintenance person (serviceperson) in his/her maintenance work. In other words, embodiments of the present invention provide a remote management system that can efficiently manage office appliances.

The present invention is not limited to the specifically disclosed embodiments, and variations and modifications may be made without departing from the scope of the present invention.

What is claimed is:

1. A communication apparatus connected to a network including plural network segments to which managed devices are connected and also connected via a communication line to a central management apparatus, the communication apparatus comprising:
   circuitry configured to:
   search a specified network segment of the plural network segments that is specified by the central management apparatus to find the managed devices connected to the specified network segment;
   obtain device information from each of the found managed devices;
   determine, for each of the found managed devices, whether the obtained device information is invalid;
   transmit the device information, that is determined to be invalid, to the central management apparatus;
   receive updated device information from the central management apparatus responsive to sending the device information that is determined to be invalid; and
   send the updated device information from the central management apparatus to a corresponding one of the found managed devices, which is associated with the device information that is determined to be invalid.

2. The communication apparatus as claimed in claim 1, wherein the circuitry is further configured to obtain the device information that includes device status information including operation information, a device status, and setting information from each of the found managed devices.

3. The communication apparatus as claimed in claim 1, wherein
   the circuitry is further configured to determine that the device information is invalid when the device information includes invalid maintenance information and
   transmit the device information including the invalid maintenance information to the central management apparatus.

4. The communication apparatus as claimed in claim 1, wherein the circuitry is further:
   configured to detect a status change of each managed device of the found managed devices based on the obtained device information and
   transmit status change information indicating the detected status change to the central management apparatus when the detected status change indicates that maintenance of the managed device is necessary.

5. The communication apparatus as claimed in claim 1, wherein the device information includes an authentication certificate.

6. The communication apparatus as claimed in claim 1, wherein each of the plural network segments is associated with a subnet mask.

7. The communication apparatus as claimed in claim 6, wherein searching the specified network segment includes checking each of a plurality of device addresses associated with the subnet mask to obtain the found managed devices, obtaining management information base data associated with each of the found managed devices, and determining whether each of the found managed devices is an office appliance.

8. The communication apparatus as claimed in claim 1, wherein only the device information that is determined to be invalid is transmitted to the central management apparatus.

9. The communication apparatus as claimed in claim 1, wherein corresponding one of the found managed devices replaces the device information that is determined to be invalid with the updated device information.

* * * * *